(12) United States Patent
Axnäs et al.

(10) Patent No.: US 8,737,402 B2
(45) Date of Patent: May 27, 2014

(54) MULTI-CARRIER SCHEDULING

(75) Inventors: Johan Axnäs, Solna (SE); Tobias Tynderfeldt, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 708 days.

(21) Appl. No.: 11/913,446

(22) PCT Filed: May 11, 2005

(86) PCT No.: PCT/SE2005/000682
§ 371 (c)(1),
(2), (4) Date: Nov. 2, 2007

(87) PCT Pub. No.: WO2006/121376
PCT Pub. Date: Nov. 16, 2006

(65) Prior Publication Data
US 2008/0186976 A1    Aug. 7, 2008

(51) Int. Cl.
*H04L 12/28* (2006.01)
(52) U.S. Cl.
USPC ........... 370/394; 370/390; 714/748; 714/749; 714/750; 714/751
(58) Field of Classification Search
USPC .............. 370/395.4, 470, 210, 229–231, 235, 370/236, 241, 242, 248, 390, 394; 714/748–751
See application file for complete search history.

(56) References Cited

U.S. PATENT DOCUMENTS 5,592,471 A * 1/1997 Briskman ...................... 455/506
5,640,415 A    6/1997 Pandula
7,110,421 B2 * 9/2006 Feinberg ....................... 370/473
2002/0054607 A1 * 5/2002 Morelos-Zaragoza et al. ............................. 370/470
2002/0172162 A1  11/2002 Goodings
2003/0045231 A1 * 3/2003 Chapelle et al. ............. 455/12.1
2003/0048856 A1 * 3/2003 Ketchum et al. .............. 375/260

(Continued)

FOREIGN PATENT DOCUMENTS

| CN | 1505889 A | 6/2004 |
| CN | 101171787 A | 4/2008 |
| EP | 1 635 518 A | 3/2006 |
| WO | 2004/017545 A1 | 2/2004 |
| WO | 2004/114610 A1 | 12/2004 |

OTHER PUBLICATIONS

International Search Report for PCT/SE2005/000682 mailed Jan. 3, 2006.

(Continued)

*Primary Examiner* — Mark Rinehart
*Assistant Examiner* — Mang Yeung
(74) *Attorney, Agent, or Firm* — Nixon & Vanderhye, P.C.

(57) ABSTRACT

The invention provides a scheduling of data blocks on multiple data carriers and a selection of data carrier to listen to. A transmitting unit simultaneously transmits, during a communication session with at least one participating receiving unit, at least a first data block on a first data carrier and a second data block on a second data carrier. The receiving unit selects which of these data carriers to listen to, i.e. whether to receive the first or second data block, based on a reception quality of a previously received data block. Furthermore, at least one of the first and second data block is based on information common to the data block and the previous data block, e.g. the first or second data block could be re-transmitted version of the previous block.

29 Claims, 14 Drawing Sheets

(56) References Cited

U.S. PATENT DOCUMENTS

| | | | |
|---|---|---|---|
| 2003/0099256 A1 | 5/2003 | Feinberg | |
| 2004/0090933 A1* | 5/2004 | McFarland et al. | 370/328 |
| 2004/0266448 A1* | 12/2004 | Kato et al. | 455/450 |
| 2005/0094603 A1* | 5/2005 | Kim et al. | 370/334 |
| 2007/0002786 A1* | 1/2007 | Herrmann | 370/328 |

OTHER PUBLICATIONS

English translation of Chinese Office Action mailed Apr. 13, 2010 in corresponding Chinese application 200580049737.1.

Japanese Office Action and partial English translation thereof mailed Nov. 9, 2011.

Japanese Final Office Action and partial English translation thereof mailed Apr. 8, 2011.

3GPP TS 43.246, version 6.1.0: $3^{rd}$ Generation Partnership Project; Technical Specification Group GSM/EDGE Radio Access Network; Multimedia Broadcast Multicast Service (MBMS) in the Geran; stage 2 (Release 6), Nov. 2004.

Chinese Search Report issued in Application No. 201110374281.3 dated Sep. 4, 2013.

Chinese Office Action issued in Application No. 201110374281.3 dated Sep. 18, 2013 with English translation.

* cited by examiner

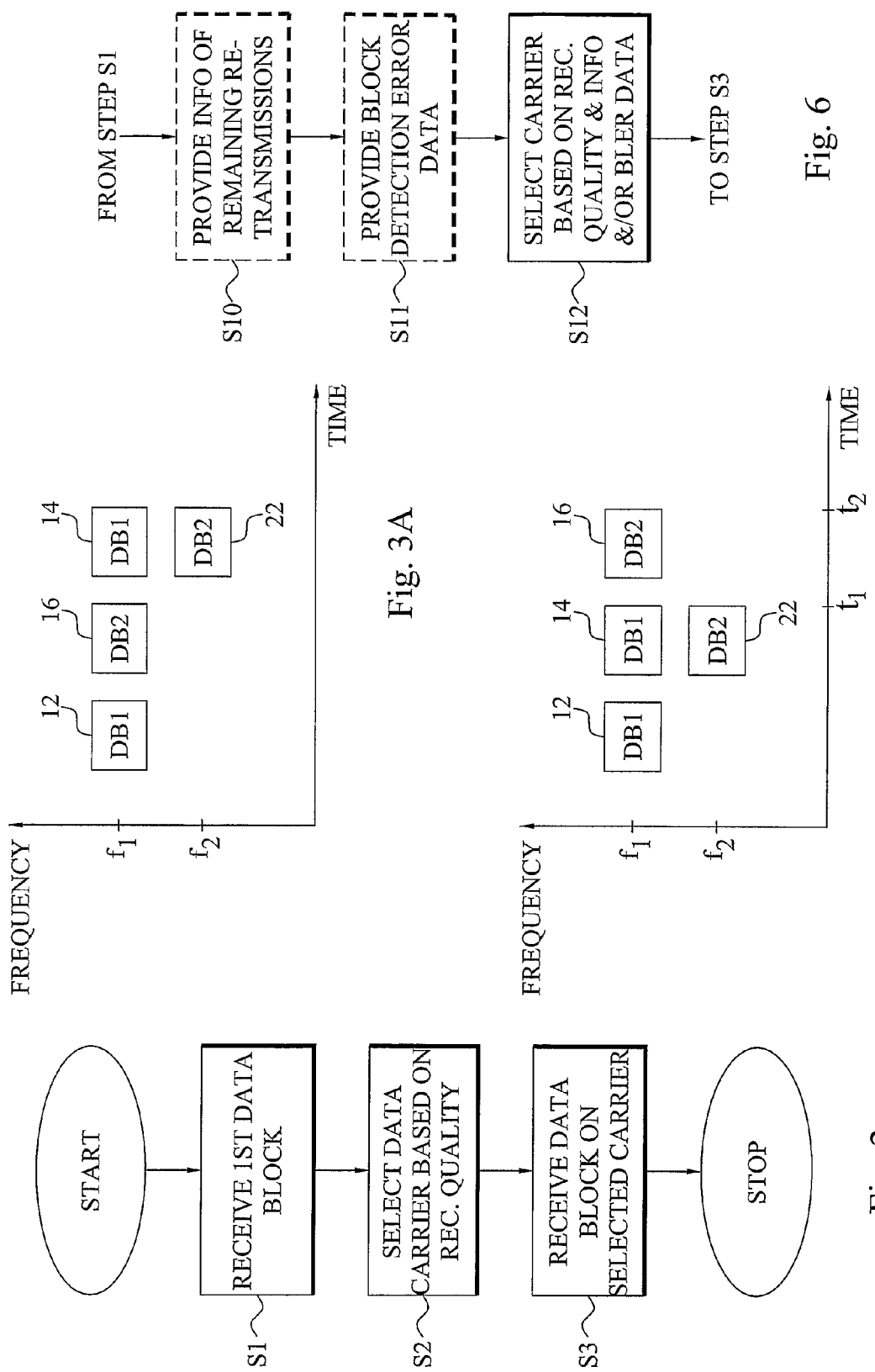

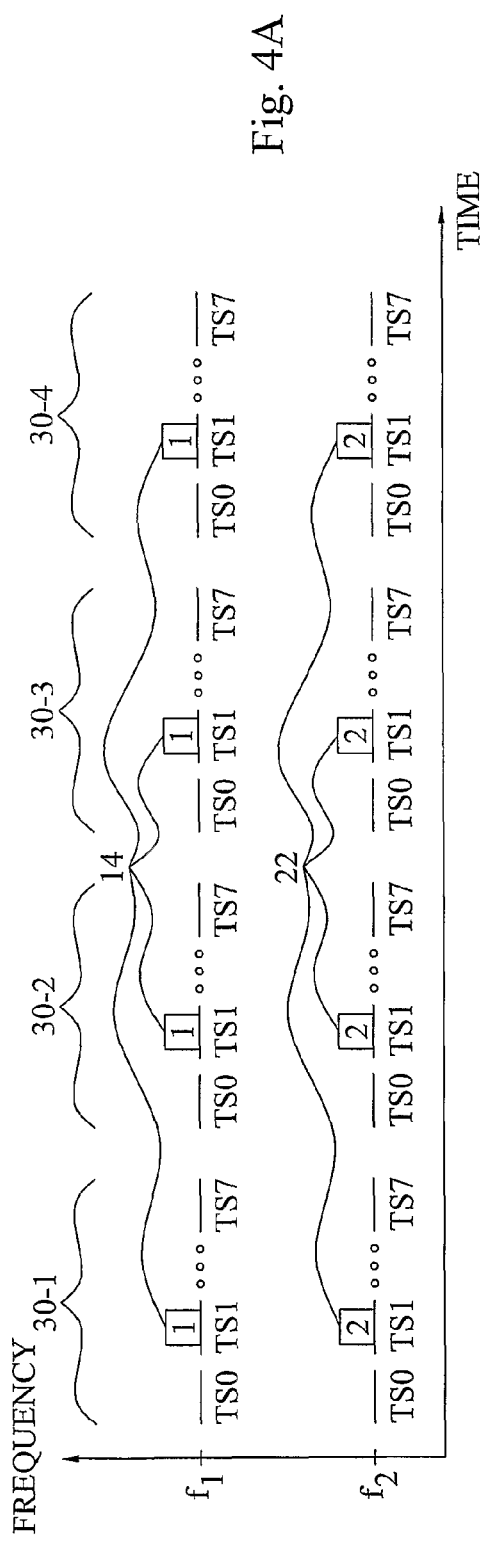
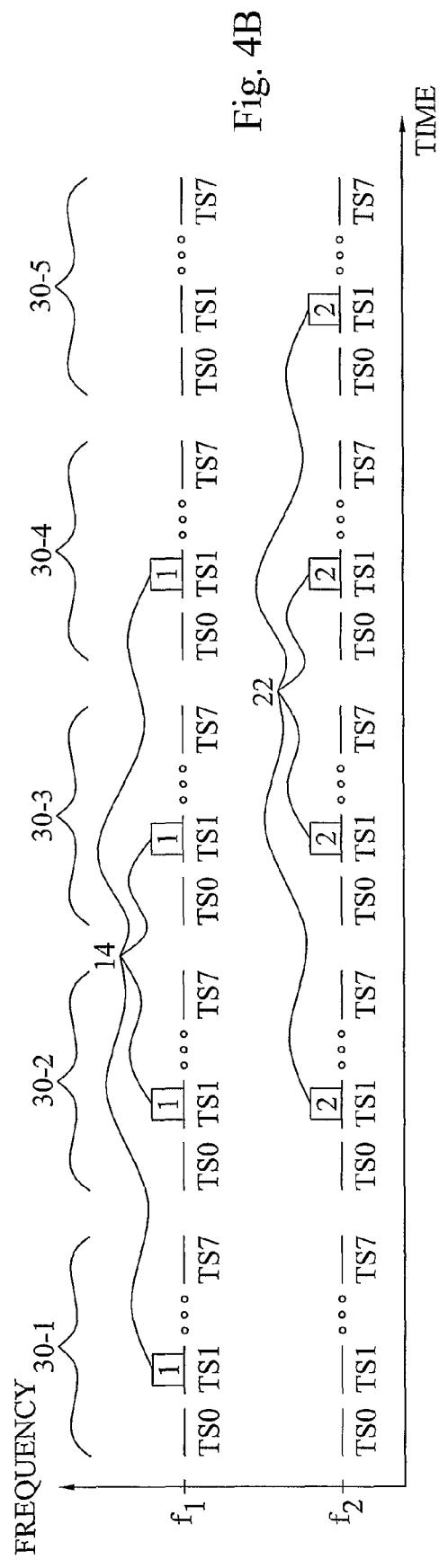

MULTI-CARRIER SCHEDULING

TECHNICAL FIELD

The technology described herein generally relates to data block scheduling in radio communications systems, and in particular to scheduling transmission and reception of data blocks on multiple data carriers.

BACKGROUND

Utilization of radio resources and channels is continuously subject to much research and development in order to optimize system throughput due to the limited availability of radio resources in communications systems. This is especially true when introducing new communications services to the existing communications systems. An example of such a new communications service is Multimedia Broadcast Multicast Service (MBMS). The benefit of this MBMS service is that it enables simultaneous distribution of data to several users using the same physical channel, i.e. so-called point-to-multipoint transmission. For more information of MBMS reference is made to the 3GPP document [1].

However, although the existing communications systems, e.g. GSM (Global System for Mobile communications) and EDGE (Enhanced Data rates for GSM Evolution) communications systems, are typically dimensioned for providing guaranteed minimum C/I (carrier-to-interference) levels adapted for traditional voice services, these guaranteed minimum C/I levels are often too low to successfully provide new high bit rate services, e.g. video streaming over MBMS. Due to the demand for high bit rates, these services must often use the maximum number of allowed communications resources (time slots).

However, radio link simulations have shown that even when using the maximum number of communications resources in GSM/EDGE systems, data blocks often have to be re-transmissions many times to provide acceptable robustness down to the minimum guaranteed C/I levels. The number of such re-transmission to provide the acceptable robustness is, though, often too high in existing GSM/EDGE systems, resulting in unacceptable low throughputs.

The obvious solution to this trade-off between low robustness (due to too few re-transmissions) and low throughput (due to too many re-transmissions) is to introduce a multi-carrier EDGE solution. However, although this is possibly relatively straightforward in the base stations of existing communications systems, a multi-carrier solution would require major changes in the mobile terminals because these terminals then have to process multiple channels simultaneously, both in analogue and digital parts.

SUMMARY

Thus, there is a need for a solution that allows implementation of high bit rate services in existing communications systems and still provides acceptable robustness and throughput but without requiring major changes in the existing mobile terminals.

The technology described herein overcomes these and other drawbacks of the prior art arrangements.

It is a general object of the technology described herein to provide a robust data block scheduling with high data block throughput.

It is another object of the invention to provide a scheduling that involves simultaneous transmission of data blocks on multiple data carriers.

Yet another object of the invention is to provide a selection of data carriers that simultaneously are used for transmitting data blocks.

It is a particular object of the technology described herein to provide a transmission scheduling and reception selection that reduces the data block error rates.

These and other objects are met by the invention as defined by the accompanying patent claims.

Briefly, the technology described herein involves simultaneous transmission of data blocks on multiple different data carriers to receiving units participating in a communications session with the transmitting unit. These data blocks on the different carriers are related to the current communications service, which can be unicast service, or particularly a broadcast or multicast service.

At least a first data block is transmitted on a first data carrier simultaneously as a second data block is transmitted on a second data carrier in this multi-carrier scheduling. A receiving unit then selects which of these data carriers to listen to, i.e. whether to receive the first or second data block. This data carrier selection is performed, at least partly, based on the reception quality of a previously received data block relevant for the session. Furthermore, this previous data block and at least one of the first and second data block are based on common information. For example, one of the first and second data block could include at least a portion of the information of the previous data block or be a re-transmitted version thereof.

By selecting between these two data carries based on the reception quality, the receiving unit basically selects, whether to receive further information associated with the previous data block (e.g. a further re-transmission of the previous data block) or new information.

In a typical implementation of the invention, if the receiving unit did not successfully receive and decode the previous data block, as represented by the reception quality, it might be advantageous to receive further data bits related to the incorrectly decoded information. In such a case, the receiving unit preferably selects the data carrier which carries the data block that is related to this previous data block in order to increase the chances of correctly decoding and interpreting the information carried by the previous and current data block. If, however, the receiving unit has successfully received and decoded the previous data block, it is often wasteful and pointless from decoding point of view to receive the data block that contains bits related to the already successfully decoded information. In such a case, the receiving unit preferably selects the data carrier carrying a data block that comprises new information not related to the previous data block.

In particular in broadcast and multicast sessions with multiple participating receiving units, some of these units will typically have correctly received the previous data block, whereas others have not. In such a case, the unsuccessful receiving units will get a new chance of trying to receive and decode the information at the same time as the successful receiving units can, by selecting another data carrier, receive a new data block and new information. As a consequence of this, the nominal block error ratio in the system will decrease without any significant decrease in the nominal block throughput.

The selection of data carrier according to the technology described herein can be based on other parameters than the reception quality of the previous data block. For example, information of the remaining number of re-transmissions of the data blocks, information of control frames that are regarded as failed and/or carrier quality of the employed data carriers can be used together with the reception quality.

The transmitting unit is adapted for simultaneously transmitting at least a first stream of data block on a first data carrier and a second block stream on a second data carrier. This first stream comprises a first set of multiple data blocks and the second stream, likewise, comprises a second set of multiple data blocks. In addition, the second set is a re-shuffled version of the data blocks of the first set. As a consequence, each data block in the second set comprises the same information as a data block in the first set but the relative order of the data blocks of the second set is different from the relative order of the data blocks in the first set. The position of the first set within the first stream could be the same as the position of the second set within the second stream. However, it is preferred if there is only a partial overlap or no overlap in the transmission of the two sets, i.e. the second set being a time-delayed and re-shuffled version of the first set.

In addition, different data rates can be used when transmitting the data blocks of the first and second set. For example, each time a data block is transmitted for the first time a high data rate can be used, whereas a lower data rate is used for the re-transmissions of this particular block.

In a preferred embodiment, the relative position of two data blocks that are based on common information are different in the second set compared to the relative position of these data blocks in the first set. Furthermore, the distance between these data blocks in terms of the number of intermediate data blocks is preferably larger in the second set compared to the first set in order to increase the diversity when transmitting the data blocks of the second set. Such a scheduling scheme increases the diversity and combats fading problems.

The invention offers the following advantages:
Allows robust transmission of data blocks without a drop in the block throughput;
The simultaneous multiple available data carriers provides a flexibility that decreases the block error rate;
Allows a more efficient use of the available radio resources in a communications system;
Enables satisfactory operation of high bit rate and broadcast services at low carrier-to-noise and carrier-to-interference levels; and
Enables implementation of high bit rate services, such as video over MBMS, in existing communications systems even down to approximately the same carrier-to-interference levels as traditional voice services.

Other advantages offered by the technology described herein will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 2 is a flow diagram illustrating an embodiment of receiving data blocks according to the technology described herein;

Figure 8:
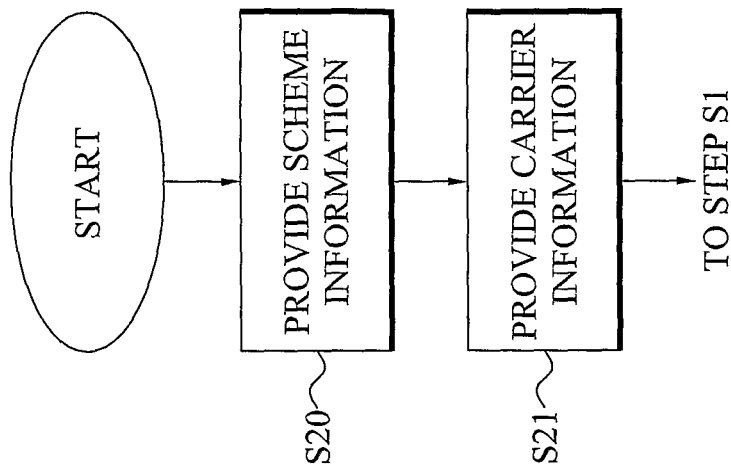
Figure 5:
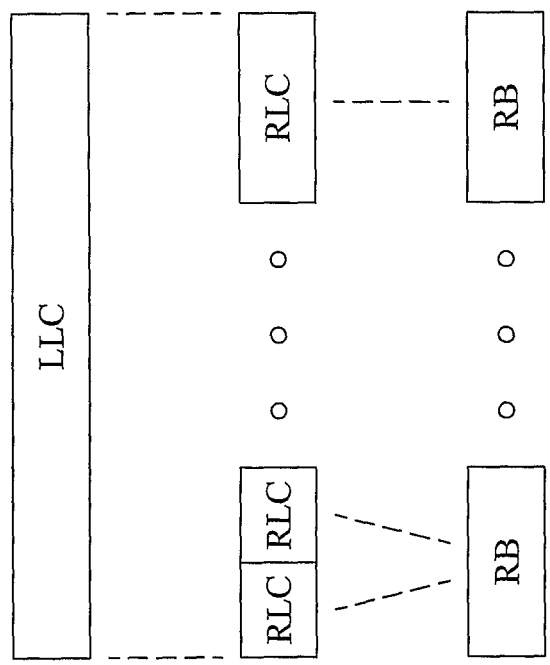
Figure 7:
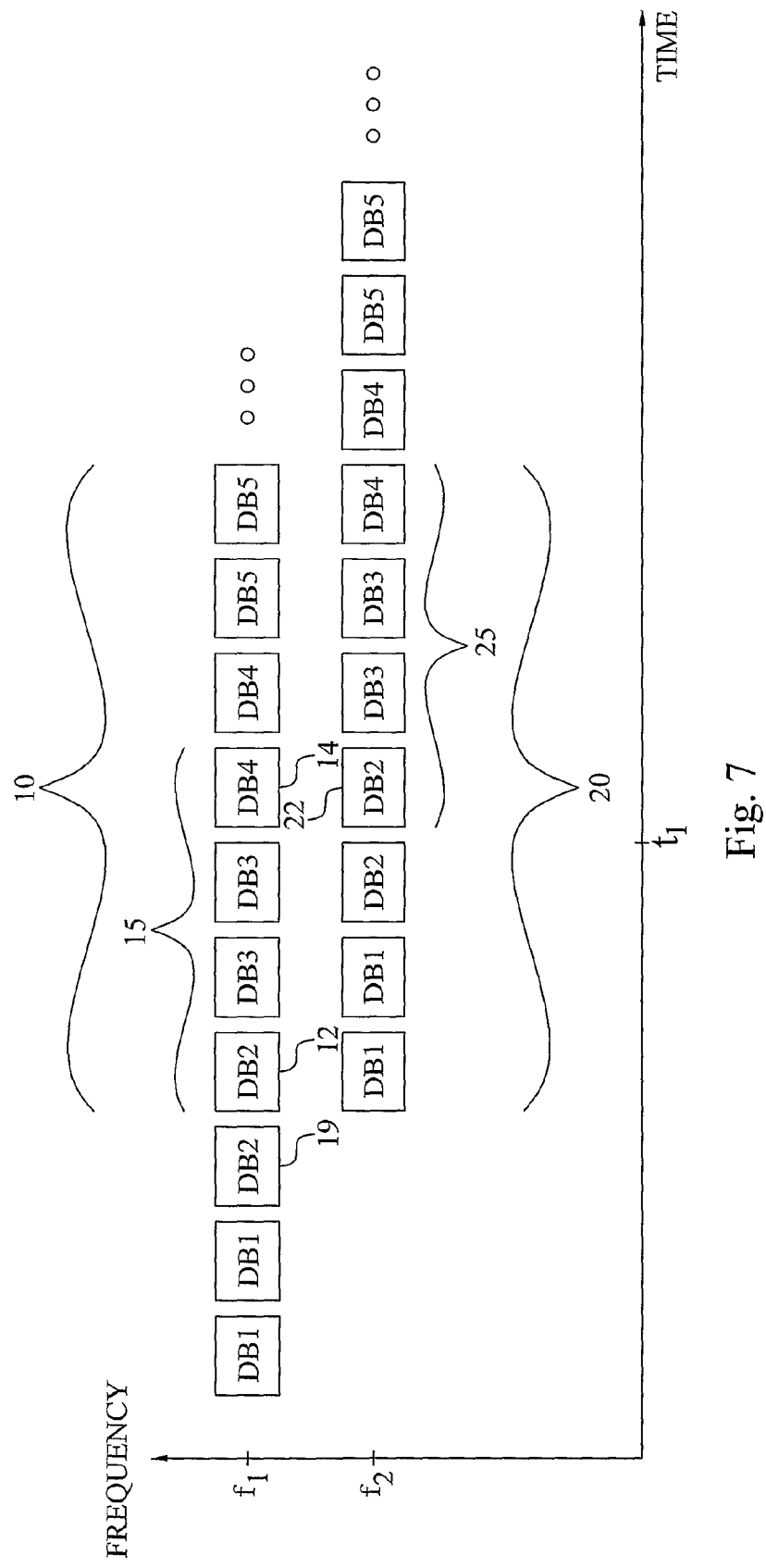
Figure 15:
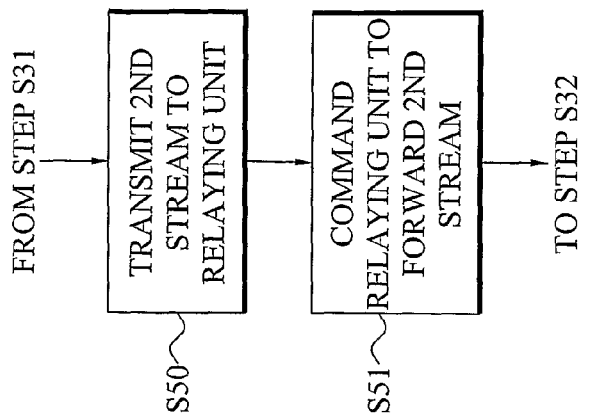
Figure 10:
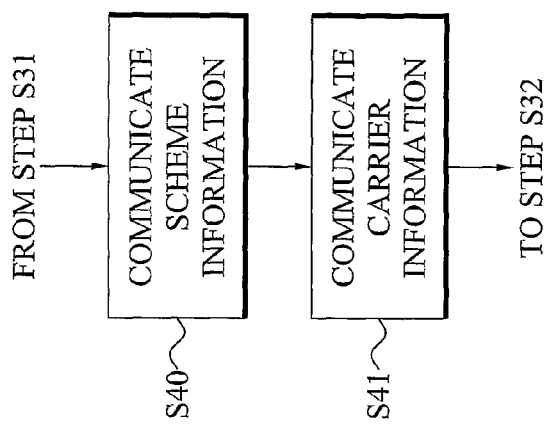
Figure 9:
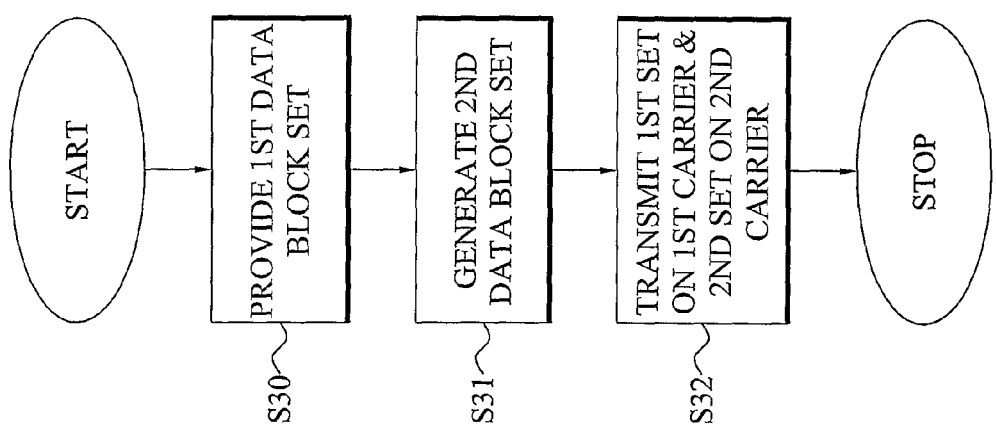
Figure 11:
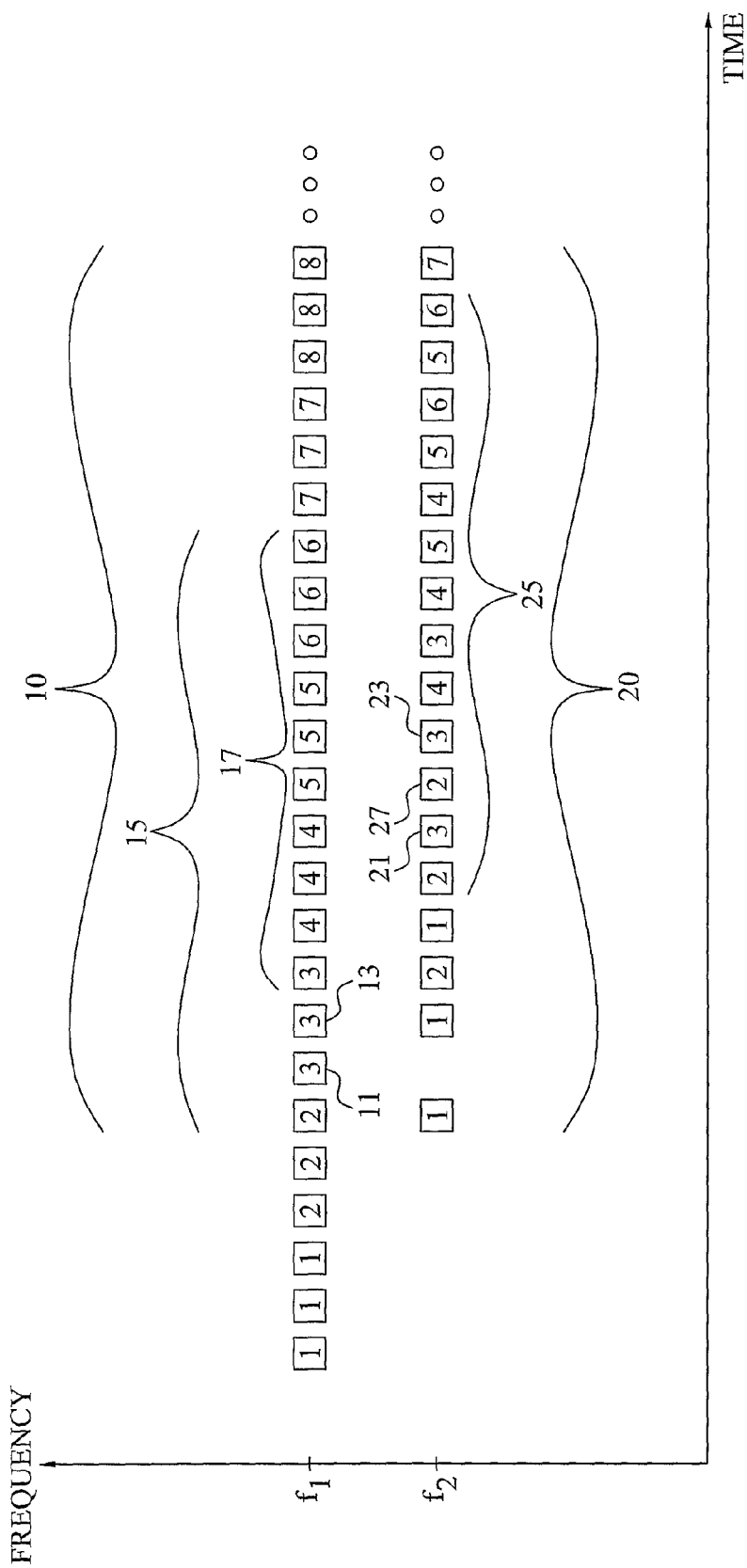
Figure 12:
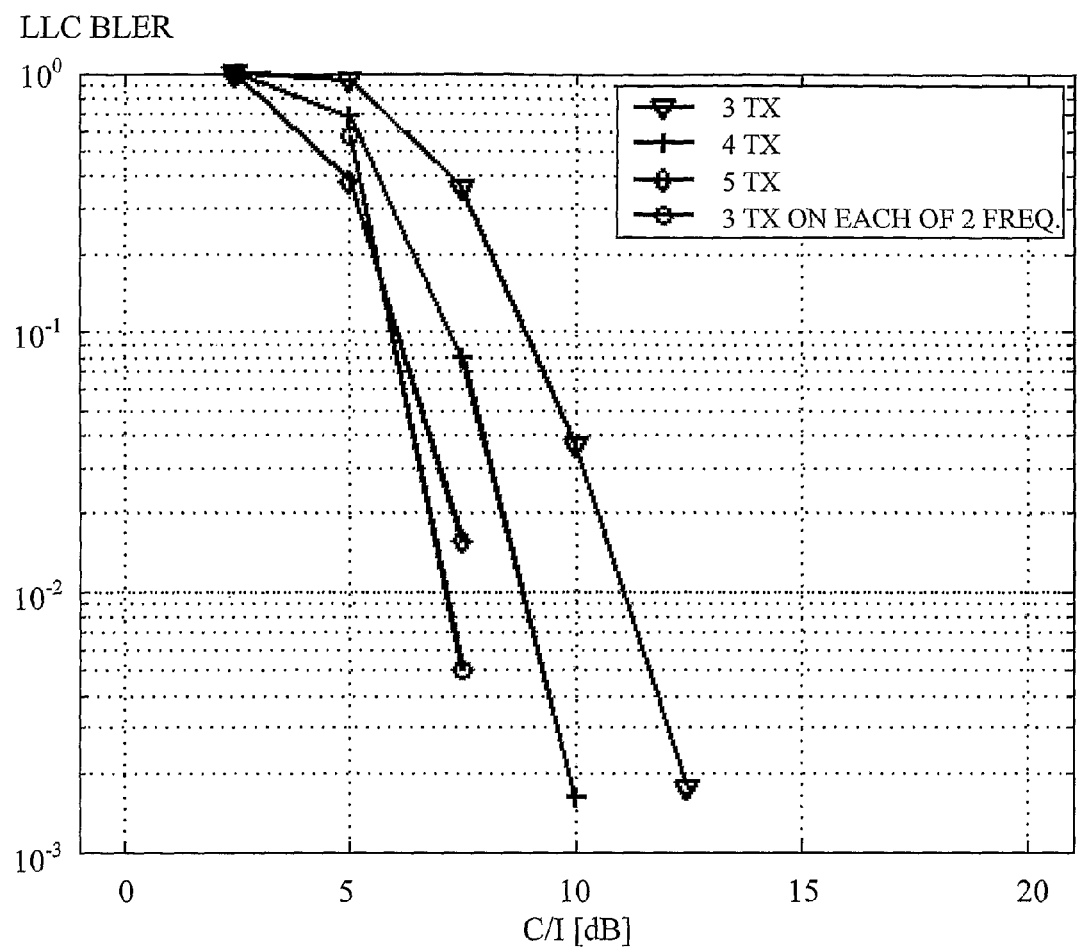
Figure 13:
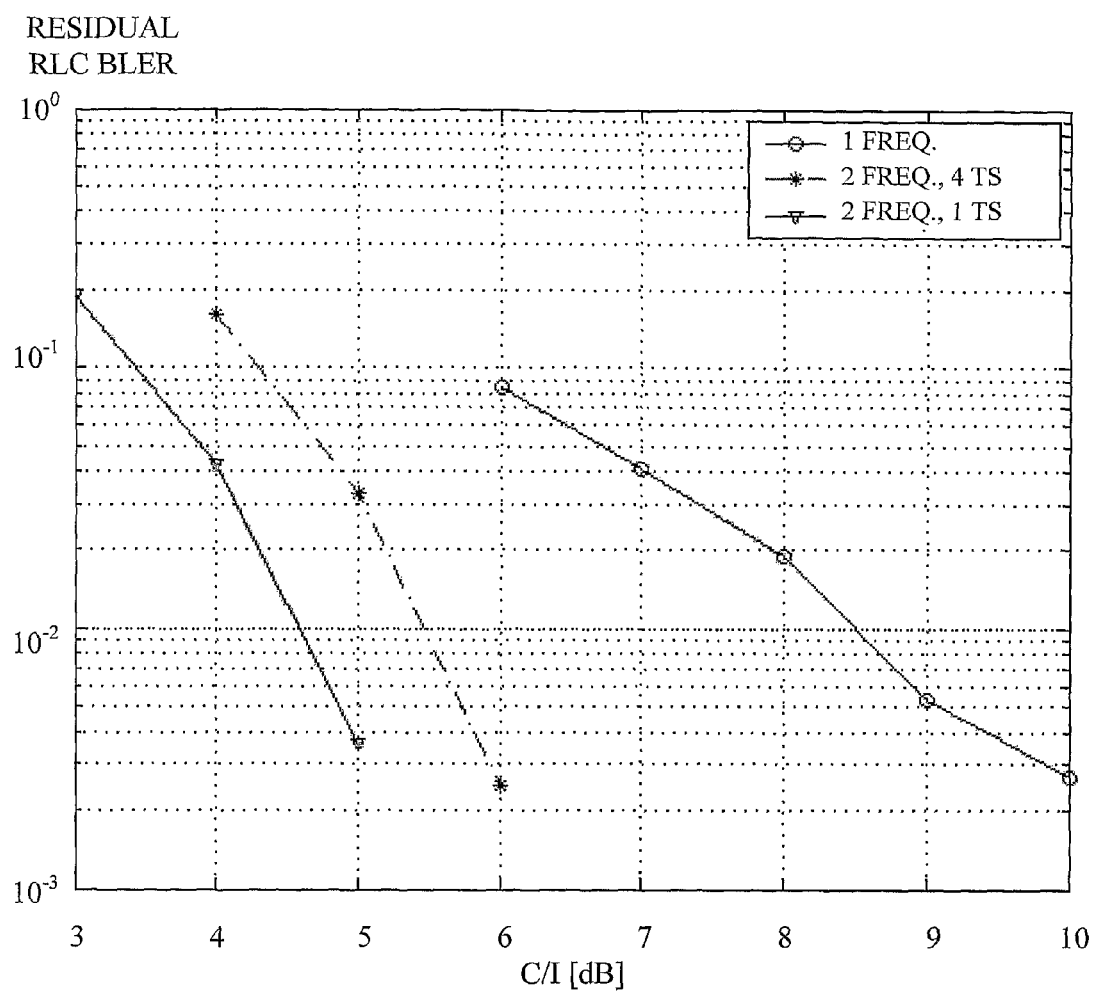
Figure 14:
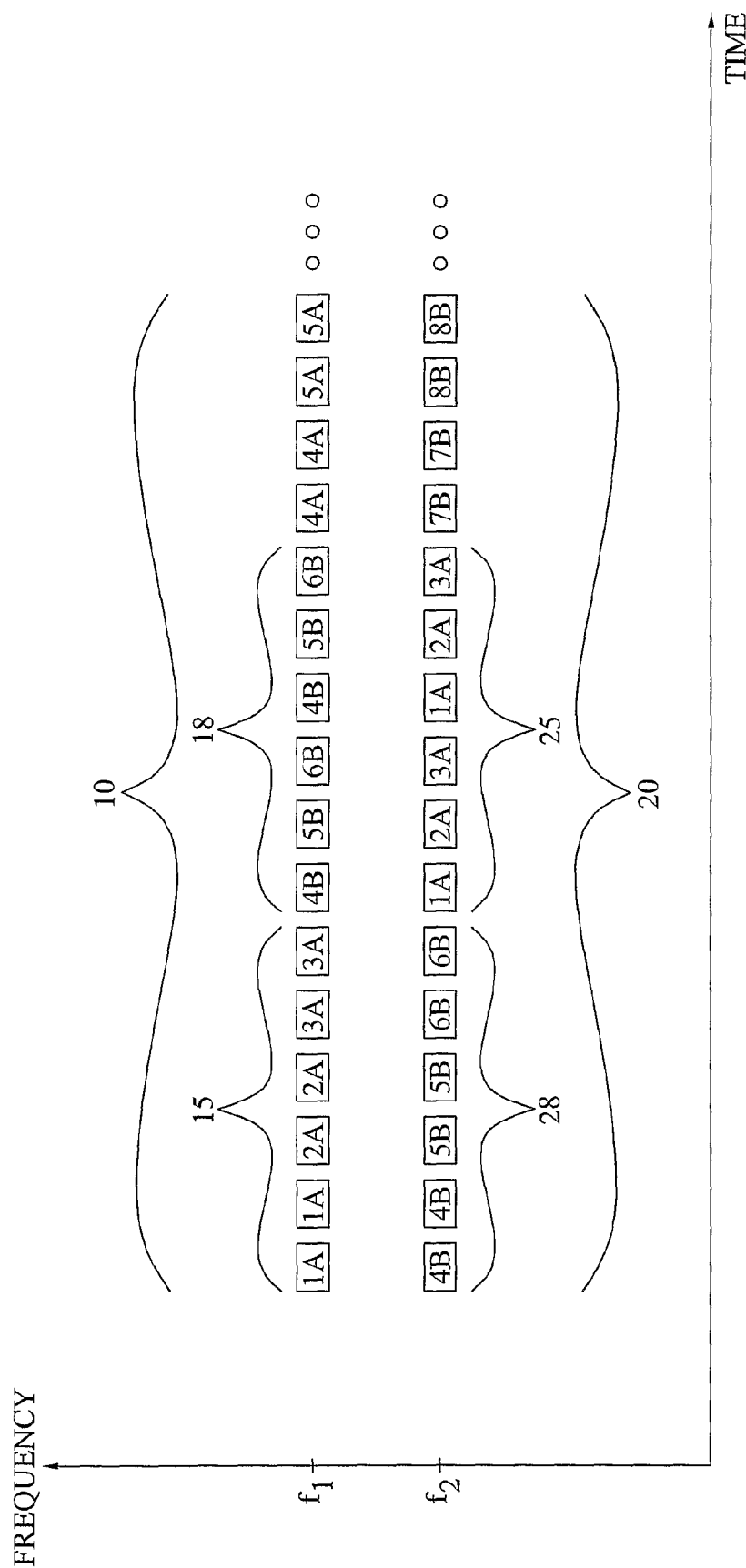
Figure 16:
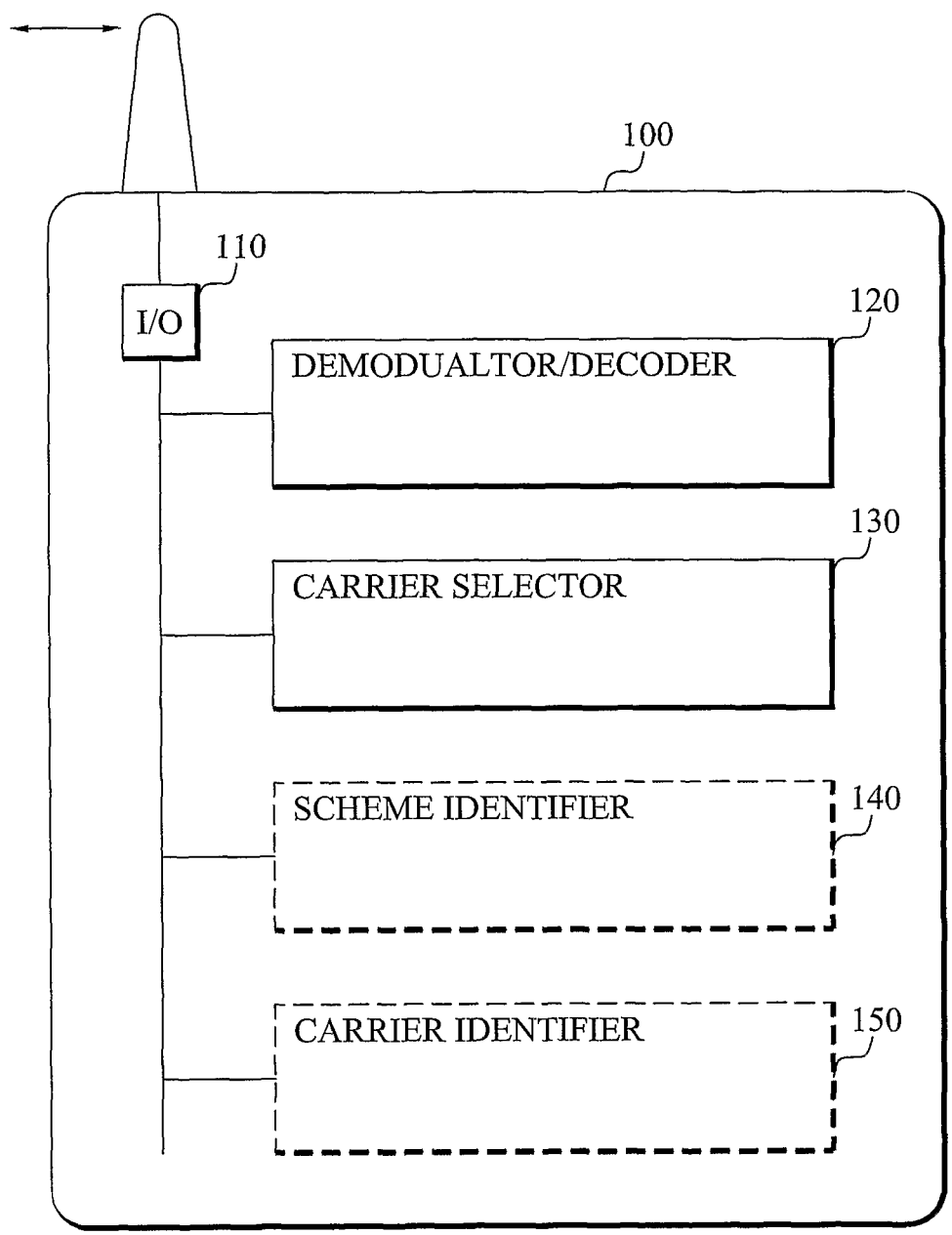
Figure 17:
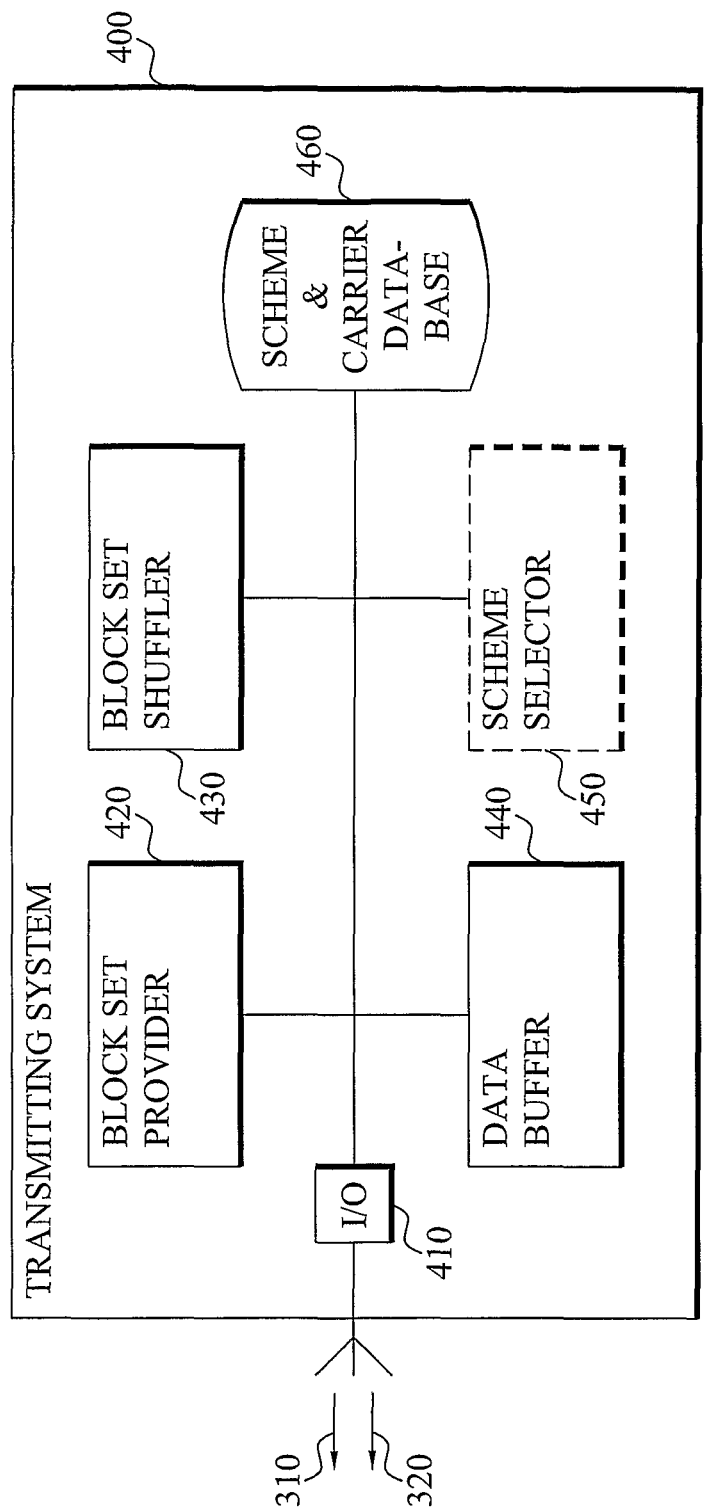
Figure 18:
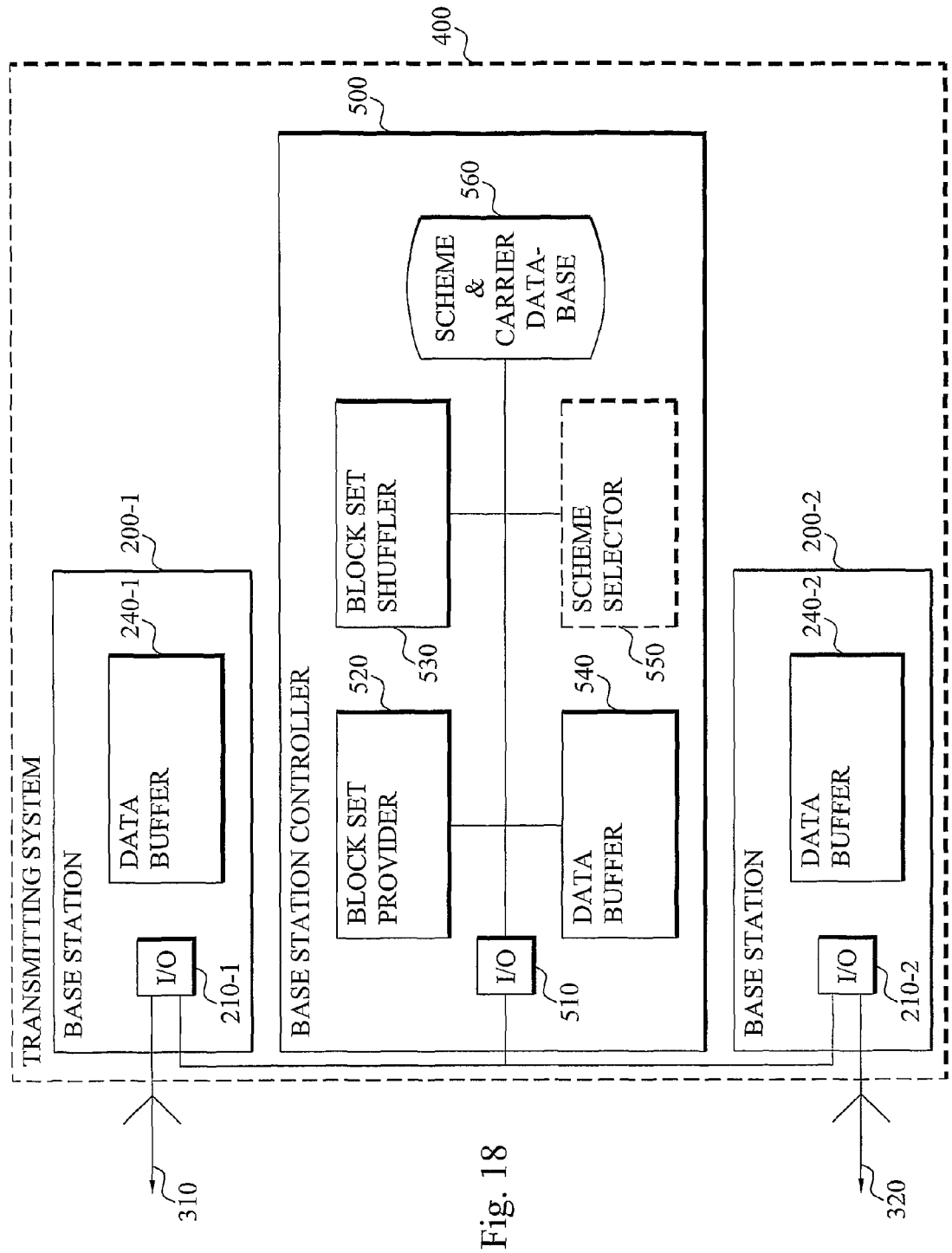
Figure 19:
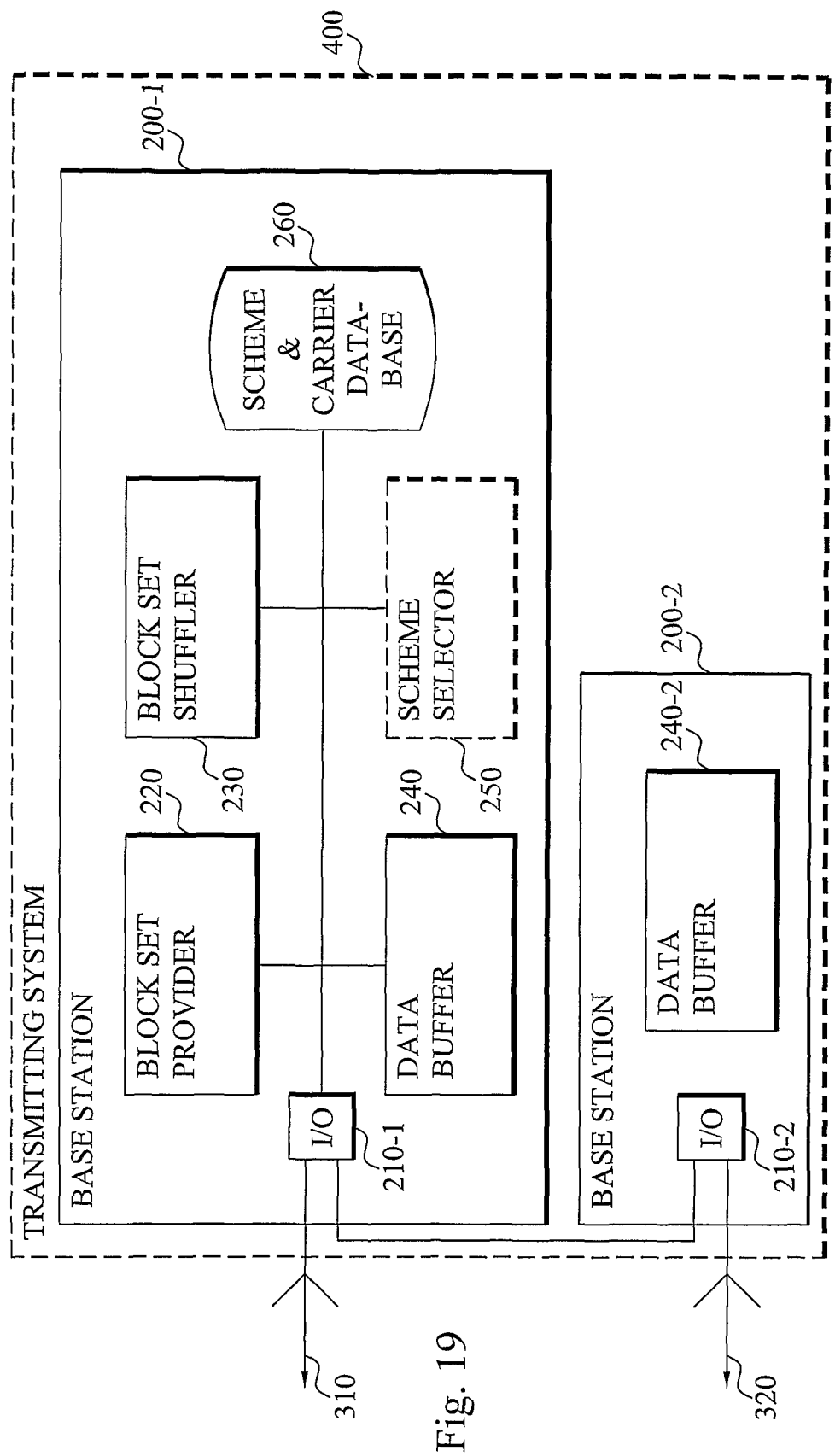

FIGS. 3A and 3B schematically illustrate embodiments of transmitting data blocks on different data carriers;

FIGS. 4A and 4B schematically illustrate embodiments of simultaneously transmitting data blocks on different carriers;

FIG. 5 schematically illustrates organization of data blocks according to an embodiment of the technology described herein;

FIG. 6 is a flow diagram illustrating an embodiment of the selecting step of FIG. 2 in more detail;

FIG. 7 schematically illustrates another embodiment of transmitting data blocks on different data carriers;

FIG. 8 is a flow diagram illustrating additional steps of the data block receiving method of FIG. 2;

FIG. 9 is a flow diagram illustrating an embodiment of transmitting data blocks according to the technology described herein;

FIG. 10 is a flow diagram illustrating an embodiment of the set generating step of FIG. 9 in more detail;

FIG. 11 schematically illustrates an embodiment of transmitting data blocks according to the technology described herein;

FIG. 12 is a diagram comparing the performance of an embodiment of the technology described herein with prior art techniques;

FIG. 13 is a diagram comparing the performance of embodiments of the technology described herein with prior art solution;

FIG. 14 schematically illustrates another embodiment of transmitting data blocks according to the technology described herein;

FIG. 15 is a flow diagram illustrating an embodiment of the transmitting step of FIG. 9 in more detail, FIG. 16 is a schematic block diagram illustrating a receiving unit according to the technology described herein represented as a mobile terminal;

FIG. 17 is a schematic block diagram illustrating an embodiment of a transmitting system according to the technology described herein;

FIG. 18 is a schematic block diagram illustrating another embodiment of a transmitting system according to the technology described herein; and FIG. 19 is a schematic block diagram illustrating a further embodiment of a transmitting system according to the technology described herein.

DETAILED DESCRIPTION

Throughout the drawings, the same reference characters will be used for corresponding or similar elements.

The technology described herein relates to transmitting and receiving data blocks on multiple, i.e. at least two, data carriers in order to increase the probability of successful reception and detection of the data blocks by a receiving unit. A first aspect of the invention provides a method and unit for selecting and receiving data blocks simultaneously transmitted on multiple data carriers. A second aspect of the invention relates to a method, system and network node for transmitting data blocks simultaneously on multiple data carriers.

Figure 1:
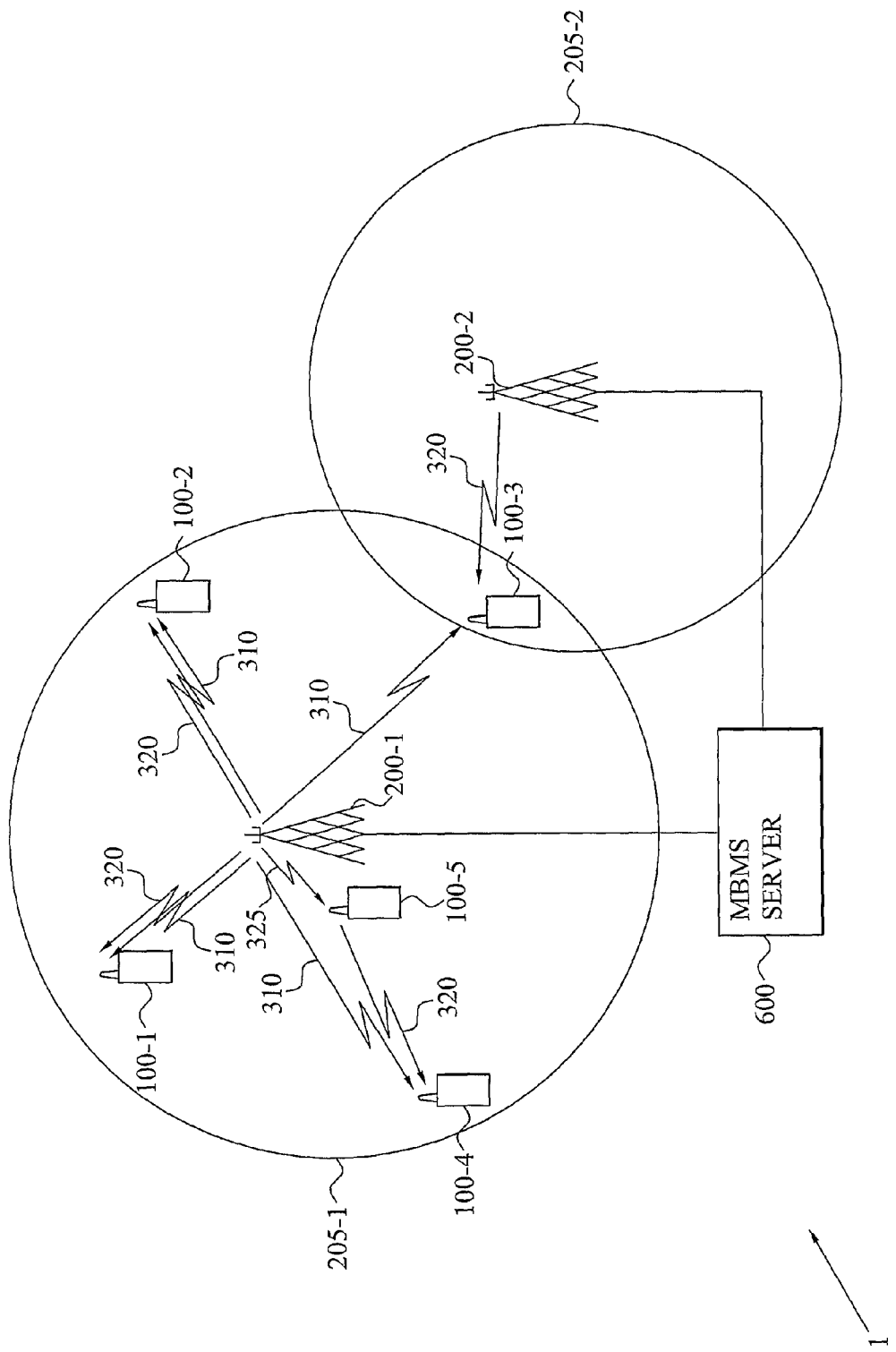
FIG. 1 is a schematic overview of a communications system employing the technology described herein.

FIG. 1 is a schematic overview of a communications system 1 employing the technology described herein. In this illustrative system 1, four mobile terminals or units 100-1 to 100-4, present in the radio coverage area 205-1 of a network node or base station 200-1, are involved in a communications session with the base station 200-1. The communications session could be a broadcast and/or multicast (point-to-multipoint) service, such as Multimedia Broadcast Multicast Service (MBMS). However, the technology described herein is not limited thereto, but can generally be applied to any form of communications service, including unicast (point-to-point) services, and in particular to high bit rate services possibly requiring multiple radio channels or resources and, furthermore, services without or with limited acknowledgement possibilities.

In the communications system 1 of FIG. 1, the base station 200-1 receives MBMS data from an associated or connected MBMS server 600 and transmits this data in the form of data blocks or packets in a point-to-multipoint manner using at least two different data carriers 310, 320 to the mobile terminals 100-1 to 100-4 participating in the MBMS session.

Note that the transmission of data blocks on the multiple data carriers 310, 320 may be managed by two different transmitters, e.g. two base stations 200-1, 200-2. In such a case, a first base station 200-1 can transmit data blocks on a first data carrier 310 and a second base station 200-2 then simultaneously transmits data blocks on a second different data carrier 320. A mobile terminal 100-3 present in the radio coverage area 205-1, 205-2 of both these base stations 200-1, 200-2 can potentially receive the data blocks on both data carriers 310, 320.

In a further example, the at least second transmitter could actually be a mobile terminal 100-5 itself that then functions as a relaying capable unit for another mobile terminal 100-4. This will be discussed in more detail below.

Thus, the technology described herein is applicable to a communications system 1 where data blocks are simultaneously transmitted on at least two data carriers 310, 320 by one transmitting unit or node 200-1 or multiple transmitting units 200-1, 200-2; 100-5.

The technology described herein is in particular applicable to GSM (Global System for Mobile communications) and EDGE (Enhanced Data rates for GSM Evolution) communications systems, but can equally be applied to any FDMA (Frequency Division Multiple Access) system. The invention can further by applied to communications systems employing other division multiplex techniques, such as OFDM (Orthogonal Frequency Division Multiplex) systems or multi-carrier CDMA (Code Division Multiple Access) systems, including multi-carrier WCDMA (Wideband CDMA) systems. Furthermore, the technology described herein can also be applied to Digital Video Broadcast (DVB) used for satellite, mobile and/or terrestrial broadcast transmissions and other types of broadcast over radio.

A "data carrier" is according to the technology described herein any carrier that is employable in a wireless communications system, including broadcasting systems, for conveying or transmitting data in the form of data blocks or packets from a transmitting unit to a receiving unit. A typical preferred example of such a data carrier is a frequency carrier. In the case of a communications system employing frequency hopping, a data carrier is defined to include the frequency hopping pattern, i.e. all radio bursts of a data block are regarded as transmitted on the same data carrier even though the frequency carrier of these radio bursts need not be the same. In an OFDM or WCDMA system, a data carrier can be a subset of the available orthogonal sub-carriers.

FIG. 2 is a flow diagram illustrating a method of receiving data blocks according to an embodiment of the technology described herein. This receiving method is based on selecting between data carriers that simultaneously carry data blocks in a given communications session. The method starts in step S1, where a receiving unit, e.g. a mobile terminal, receives a first data block in the communications session from a transmitting unit, e.g. a base station. The receiving unit tries to decode the received data block and generally provides a quality indication representative of the reception quality of this first data block.

In a first implementation of the invention, this reception quality could simply specify whether the receiving unit could correctly decode the whole content of the data block or not. However, also more elaborated quality representations could be employed according to the invention. For example, the signal-to-noise ratio (SNR) can represent such a reception quality indication. Further examples of parameters that can be used for representing the reception quality of the first data block include block error probability (BLEP), block error ratio (BLER), bit error probability (BEP), bit error ratio (BER), carrier-to-interference (C/I) ratio, etc. Thus, generally any representation indicative of the reception quality of the first data block by or in the receiving unit can be used according to the technology described herein. The reception quality representation can be estimated by the decoding equipment of the receiving unit, for example by running a cyclic redundancy check (CRC), or by some other quality estimating unit in the receiving unit. In the case where a given data block has been transmitted and, thus, received a number of times, the quality representation of the invention is preferably an accumulated quality taking the total quality of all (re-)transmissions of that particular block into account. This principle can also be extended to the case where two data blocks are based on common information but are not re-transmissions of each other. In such a case, the reception quality can be an accumulated quality based on the (individual) reception qualities of the two data blocks.

In a next step S2, the receiving unit selects a data carrier of the at least first and second data carrier to listen to based on this reception quality of the first data block. Furthermore, the first data carrier carries a second data block simultaneously as the second data carrier carries a third data block, where this third data block and the previous first data block are based on common information. Thus, in an implementation of the invention, the third data block could be a copy of the first data block, i.e. comprising the same payload information as the first data block, though potentially being modulated and/or coded differently. In another implementation, the third data block comprises a portion of the information of the first data block. For example, the third data block could include a first portion that contains the same information bits as included in a part of the first block and a second (remaining) portion that contains other information bits. In yet another implementation, the third data block includes incremental redundancy related to the information in the first data block.

In other words, by selecting between these two data carriers based on the reception quality, the receiving unit basically selects, whether to receive the second or third data block. Since the third data block comprises information related to the information carried in the previously received first data block, this selection between data carriers could also be regarded as a selection, based on the reception quality of the first block, between receiving further information associated with the first data block (e.g. a further re-transmission of the first data block) or new information (second data block).

In a typical implementation of the invention, if the receiving unit did not successfully receive and decode the first data block, as represented by the reception quality, it might be advantageous to receive further data bits related to the incorrectly decoded information. In such a case, the receiving unit preferably selects the second data carrier in step S2 in order to be able to receive the third data block and thereby increasing the chances of correctly decoding and interpreting the information carried by the first and third data block. If, however, the receiving unit successfully received and decoded the first data block in step S1, it is often wasteful and pointless from decoding point of view to receive the third data block since this data block contains bits related to the already successfully decoded information. In such a case, the receiving unit preferably selects the first data carrier to be able to receive the second data block and thereby new information transmitted within the session.

In a given broadcast session, e.g. MBMS session, involving multiple receiving units, it is expected that at a given time instance some of the receiving units will correctly receive the first data block whereas other units cannot correctly decode all of the bits of this data block. The correctly decoding receiving units then typically select, based on their respective (high) reception quality of the first block, the first data carrier to receive the new information contained in the second data block. In contrast, the non-correctly decoding units preferably select, based on their respective (low) reception quality, the second data carrier in order to get an extra opportunity of decoding the information of the first data block by receiving the third data block. This extra opportunity of receiving and decoding information for the non-correctly decoding receiving units does not come at the expanse of reduced throughput or latency time for the correctly decoding receiving units since these can, based on their relatively higher reception quality associated with the first block, select to listen to another data carrier than the non-correctly decoding units and thereby receive new information bits.

The receiving unit then receives a data block, i.e. the second or third data block, on the selected data carrier in step S3. The method then ends.

The receiving method of the technology described herein as discussed above is preferably employed by all receiving units participating in a communications session, or at least by one or some of the units. The steps S1 to S3 of FIG. 1 are preferably repeated throughout the communications session for the different data blocks transmitted in the session. As a consequence of this simultaneous transmission of data blocks relevant for a same communications session on different data carriers, the number of potential transmissions and re-transmissions of information and data blocks is increased without any reduction of the throughput for the communications session.

In the description above in connection with FIG. 2, a receiving unit performs a selection between a first and a second data carrier based on the reception quality of a previously received, but not necessarily correctly decoded, data block. This should merely be seen as an illustrative example of the invention. The selection can be performed among any number n of available data carriers that simultaneously carry data blocks relevant for a communications session, where n is an integer equal to or larger than two. Note further that the technology described herein can also be applied to multi-carrier capable receiving units. In such a case, the receiving unit selects, based on the reception quality, to simultaneously listen to m data carriers out of the n possible carriers, where $1 \leq m < n$ and $n \geq 2$. This offers further advantages for the receiving unit, since the unit can save power/battery and/or hardware complexity by just listening to only a subset of all available carriers.

The first data block could have been transmitted to the receiving unit on the first data carrier, i.e. the same carrier as the second data block, the second data carrier, i.e. the same carrier as the third data block, or a third data carrier. The second and third data block can follow directly after the first data block in time, or their may be a time gap between transmission of the first data block and the simultaneous transmission of the second and third data block. In this data gap the base station might perform some other tasks or transmit other data blocks.

FIGS. 3A and 3B are illustrations of embodiments for transmitting data blocks to allow a selection of data carriers according to the technology described herein. In these figures and the following figures illustrating transmission of data blocks, the data carriers are represented by frequency carriers. This should, however, merely be seen as an illustrative, but non-limiting, example of possible data carriers according to the invention.

In the communications session, a first data block 12 is transmitted on a data carrier $f_1$ to the relevant receiving unit(s). Note that this first data block 12 does not necessarily have to be the very first data block transmitted in the session but could actually be any given data block. The receiving unit(s) receive(s) this data block 12 and generate(s) or estimate(s) a quality indication representative for the reception quality of this data block 12. This quality indication could be an accumulated quality if other related data blocks have previously been transmitted.

In FIG. 3A, a second data block 16 comprising other information than the first data block 12 is then transmitted on the same data carrier $f_1$. The receiving unit(s) preferably likewise receive(s) the second data block 16 and estimate(s) a reception quality indication for this block 16. Each receiving unit then performs a selection among the available carriers $f_1$, $f_2$ based on its respective estimated reception quality indication(s). In a first embodiment of the invention, only the reception quality associated with the first data block 12 or the second data block 16 is employed in the selection process. However, in a preferred embodiment of the invention reception quality indications representative for both these data blocks 12, 14 are preferably used in the selection to provide more selection basis. In this later case two different quality indications are employed and not an accumulated quality, since the two data blocks 12, 16 are not based on common information.

In this illustrative example, a third data block 14 is transmitted on the same data carrier $f_1$ as the first 12 and second 16 data block and is a re-transmitted version of the first block 12. The other data carrier $f_2$ is used for simultaneously transmitting a fourth data block 22 that is a re-transmitted version of the second data block 14.

Assume that a receiving unit failed to decode the first data block 12 after the first transmission but succeeded in decoding the second data block 16 after its first transmission. The receiving unit can select, based on the (low) reception quality of the first block 12 and the (high) reception quality of the second block 16, to listen to the frequency $f_1$ on which the first block is re-transmitted, i.e. receive the third data block 14. Correspondingly, a receiving unit that during the first transmissions succeeded in decoding the first data block 12 but not the second data block 16 typically selects, based on the reception quality indicators, to receive the fourth data block 22 (re-transmitted version of second block 16), i.e. listens to the other frequency $f_2$.

This embodiment of transmitting data provides an opportunity of transmitting and re-transmitting both the first 12 and second 16 data block once in only three transmission occasions. This should be compared to a corresponding prior art situation with a single data carrier and no simultaneous data block transmission that would take four transmission occasions.

FIG. 3B illustrates a somewhat different scenario where the re-transmission 14 of the first data block 12 follows directly after the first transmission on the same carrier $f_1$. When the third data block 14 is transmitted on the first frequency $f_1$, a first transmission of the second data block 22 simultaneously occurs on the other frequency $f_2$. The re-transmission 16 of this data block 22 is then on the first frequency $f_1$.

A receiving unit that correctly received the first data block 12 at the first transmission can then select to listen to the other carrier $f_2$ for potentially being able to correctly receive the second data block 22 at the time instance $t_1$. If the first transmission of the first data block 12 was not enough to enable correct decoding thereof, the receiving unit preferably continuous to listen to the first carrier $f_1$ to be able to receive the re-transmission 14 of this block 12. Such a receiving unit can then potentially correctly have received the information of the first 12 and second 22 data block at the time instance $t_2$ by then receiving and decoding the re-transmitted version 16 of the second block 22.

In a prior art situation with a single data carrier and no simultaneous data block transmission all receiving unit would have to wait until time $t_2$ before being able to receive the information contained in the first and second data block, whereas according to the invention this can be done at time $t_1$ ($t_1 < t_2$).

As has been illustrated by these simple signalling diagrams, the technology described herein allows introduction of re-transmissions of data blocks without increasing the total reception time for receiving units.

Note that the information contained in the data block 14 in FIG. 3B can be identical to the information of the data block 12 (or at least based on common information as data block 12), identical to the information of the data block 22 (or at least based on common information as data block 22) or unrelated to the data blocks 12, 22. In the case the simultaneous data blocks 14 and 22 are based on common information, the two data blocks 14, 22 could be transmitted at different data rates, be coded differently and/or include somewhat different but still related information. In the latter case, the data block 14 could, for example, be a re-transmitted version of a previously transmitted data block, whereas the data block 22 comprises incremental redundancy related to this previous data block.

In the foregoing, the technology described herein has been described with reference to selecting, based on reception quality, between at least a first and second data carrier that simultaneously carries different data blocks. FIGS. 4A and 4B illustrate the definition of "simultaneous transmission" or "simultaneously carrying" according to the technology described herein.

As is well known in the art, a data or radio block is transmitted over four radio bursts in four consecutive TDMA frames in a GSM/EDGE system. These four radio bursts in the four consecutive TDMA frames together form a so-called time slot.

With reference to FIG. 3A or 3B and FIG. 4A, the expression "simultaneous transmission" includes transmission of the data block 14 and the data block 22 on corresponding radio bursts/time slot in the same TDMA frames 30-1 to 30-4 but on different carrier frequencies $f_1$, $f_2$. For example, the radio bursts associated with time slot TS1 on the carrier frequency $f_1$ is used for the data block 14 and the radio bursts associated with time slot TS1 but on the carrier frequency $f_2$ is used for the data block 22. However, the expression "simultaneous transmission" according to the technology described herein is not limited to this illustrative example, but also includes the situation where there is a partial overlap in time of the multiple transmissions, implying that at least a portion of the data block 14 is transmitted within a same time interval as at least a portion of the data block 22 is transmitted.

FIG. 4B illustrates this situation with partial overlap in the transmissions. The data block 14 is transmitted on the time slot TS1 and four radio bursts associated with the four consecutive TMDA frames 30-1 to 30-4. However, the data block 22 is transmitted on a time slot TS1 and four radio bursts of the TDMA frames 30-2 to 30-5. This means that a portion of the data block 14 is transmitted in the TDMA frame 30-1, in which no transmission of the data block 22 is conducted. In the TDMA frames 30-2 to 30-4, data of both data blocks 14, 22 are transmitted but on different frequencies $f_1$, $f_2$. In the last illustrated TDMA frame 30-5, only a portion of the data block 22 is transmitted.

Thus, simultaneous transmission as defined according to the technology described herein also covers the situation with partial overlap in the transmission of the two data blocks. Note further that the data block 22 does not necessarily have to be transmitted using radio bursts positioned within the TDMA frame on the same position as the radio bursts used for the data block 14. With reference to FIG. 4B, the data block 14 could be transmitted on the radio bursts denoted TS1 in the TDMA frames 30-1 to 30-4, whereas the data block 22, for example, could be transmitted on the radio bursts denoted TS0 in the TDMA frames 30-2 to 30-5. In a further example of simultaneous transmission according to the invention, at least a portion of the data block 14 is transmitted within the same TDMA frame as at least a portion of the data block 22.

FIG. 5 illustrates a possible organization of data or radio blocks in control blocks or frames in a GSM/EDGE communications system employing the technology described herein. As is well known to the person skilled in the art, data or information, e.g. MBMS data, to be transmitted to receiving units is organized into LLC (Logical Link Control) blocks or frames including multiple information bits. Such an LLC frame is in turn divided into RLC (Radio Link control) blocks of possibly different sizes. The RLC blocks are packed into radio blocks (RBs) that might have fixed "raw bit size". As a consequence of the potentially different sizes of the RLC blocks, a radio block can include one or multiple, typically up to two, blocks. A radio block is then transmitted in a time slot, i.e. over four radio bursts in four consecutive TDMA frames.

A data block as defined in the technology described herein when applied to a GSM/EDGE system can be a so-called radio block or a RLC block. The selection of data carrier according to the technology described herein can then be made on a radio block basis, based on reception quality of a previously received radio block, or be made on a RLC block basis, based on reception quality of a previously received RLC block. There is generally no difference between these two embodiments in cases where the RLC block sizes are equal to the radio block sizes, i.e. there is a one-to-one relationship between the two block types. However, in cases where a radio block comprises two RLC blocks, one interleaved over the first two radio bursts of the radio block and the other interleaved over the remaining two bursts, the selection of data carrier can be made on burst pair basis. This is in particular attractive for higher modulation and coding schemes (MCS), such as MCS-8 and MCS-9. The block header is then preferably identical on the two data carriers to simplify the selection of data carriers on RLC block basis.

The selection of data carrier could actually be made at a finer granularity, i.e. on burst-to-burst basis. For example, a receiving unit could select to receive only three out of the four bursts of a radio block before attempting decoding and then switching to another data carrier. This finer granularity will improve the performance.

The selection of data carrier according to the technology described herein can be based on other information and parameters in addition to the reception quality of one or multiple data blocks. For example, it may sometimes be advantageous for the receiving unit to use a data carrier selection scheme that does not minimize the average probability of data block error. As was described above and illustrated in FIG. 5, data blocks (radio blocks and RLC blocks) are typically organized into LLC frames. If the receiving unit has concluded that one data block of a certain LLC frame is permanently lost, e.g. because all re-transmissions of the data block have already been made without successful reception, the LLC frame can be regarded as permanently lost. In such a case, the receiving unit may completely ignore the remaining data blocks of that LLC frame, even if it would have a good chance of receiving them and instead give priority to other data blocks (belonging to other LLC frames) that it would have a lower chance of receiving correctly. Thus, if a receiving unit has failed to successfully receive one or more data blocks of a particular LLC frame, the receiving unit often has nothing to gain from trying to receive and decode any remaining data blocks of that LLC frame, since an LLC frame is typically only successfully received and meaningful if the unit has correctly received all data blocks, or at least a minimum amount of data blocks, of that LLC frame.

Assume in FIG. 3B that the first data block 12 belongs to a first LLC frame and that the second data block 22 belongs to a second LLC frame. Further assume that the receiving unit previously has failed to correctly receive a data block, including any re-transmissions thereof, belonging to e.g. the first LLC frame. In such a case, even if the reception quality of the first data block 12 specifies that this block was not correctly received, the receiving unit may select, based on the reception quality of the first block and the information of the failed data block of the first LLC frame, to listen to the second frequency carrier $f_2$ in order to try to receive the second data block 22 that belongs to another non-failed LLC frame.

In another example, information of the remaining number of expected data blocks that are based on the same information as a previous data block, e.g. remaining number of expected re-transmissions of a block, can be used in the selection of data carrier according to the technology described herein. For example, assume that the receiving unit has failed to correctly receive a first data block and is informed that only one re-transmission of this failed block is shortly expected on a first data carrier. Assume further that the receiving unit is currently experiencing a very poor radio quality so that the probability of successful reception of a data block is low. In such a case, it might be wasteful for the receiving unit to listen to the first data carrier since the probability of correct reception of the last re-transmission of the first data block and decoding of the information therein might be too low. It is then typically better to listen to another data carrier in order to try to receive at least some of the information of a new data block transmitted thereon simultaneously as the first data block is transmitted on the first data carrier.

In another situation the number of expected re-transmission of a failed first data block could be more than one on a first data carrier. In such a case, the receiving unit may select, based on the reception quality of the failed first data block and the information of the number of re-transmissions of this block, to listen to another data carrier when one of the re-transmissions of the first block is simultaneously transmitted on the first data carrier. This may be due to that the reception quality of the failed first data block indicated that it is expected to be enough to receive only one more re-transmission of this block in order to successfully decode the information of therein. The receiving unit then does not need to listen to all the re-transmission of this block but can instead select to listen to another data carrier during one or more of these re-transmissions.

The selection of data carrier according to the technology described herein can also be partly based on the channel quality associated with the first and/or second data carrier. For example, assume that when a first data block is transmitted on e.g. the second data carrier, the channel/carrier quality is good, even though a decoding error arises resulting in unsuccessful reception of the first data block. From estimated channel quality data it is known that the quality of the second data carrier has deteriorated, whereas the channel quality of the first carrier is good. In such a case, it might be more advantageous to listen to the first data carrier to receive the data block transmitted thereon.

Note that a low channel quality of a given data carrier increases the probability of unsuccessful reception of a data block transmitted thereon and, thus, typically (negatively) affects the reception quality of the data block. However, the reception quality of a data block also takes other parameters than the channel quality into account and situations can arise where the reception quality is low but the channel quality is high.

FIG. 6 is flow diagram illustrating an embodiment of the selecting step S2 of FIG. 2 in more detail. The method continues from step S1 of FIG. 2. In a first optional step S10, the receiving unit provides information of the remaining number of expected data blocks that are based on the same information as a previously received data block, e.g. the number of remaining re-transmissions of the data block. Alternatively, information of expected number of re-transmissions of the next following data blocks on the at least two data carriers can be used. This information can be received from the transmitting unit that is communicating with the receiving unit and transmits data blocks thereto. In another embodiment, the receiving unit determines this number itself based on previously received data blocks. For example, the transmission scheme employed by the particular transmitting unit could be that a data block is transmitted in total three times, i.e. a first transmission and two re-transmissions. In such a case, the receiving unit can deduce or at least estimate the number of remaining transmissions based on how many times it already has received the data block. The information can also indirectly be received from the transmitting unit, which then notifies the receiving unit of the particular transmission scheme it will employ for the current communications session. The receiving unit then determines the number of remaining re-transmission based on this scheme notification and information of how many times it already has received the block.

In a next optional step S11, the receiving unit provides block detection error data associated with previously failed data blocks together with information of the LLC frame they belong to. Thus, the receiving unit preferably stores notifications of LLC frames that it regards as failed due to that it has failed to receive a data block, including any re-transmissions thereof, or at least a minimum number of data blocks belonging to that LLC frame.

The receiving unit selects, in step S12, data carrier based on the reception quality of the first data block (see step S1 in FIG. 2) and based on at least one of the information of the number of re-transmissions and the block error data or failed LLC frame data. In a first embodiment, only the reception quality and the number of re-transmission are used in the selection process. In a second embodiment, the reception quality and the block error data/failed LLC frame data is employed, whereas in a third embodiment reception quality, the number of re-transmissions and block error data/failed LLC frame data are employed. The method then continues to step S3 of FIG. 2.

In further embodiments of the invention, the selection step S12 of FIG. 6 can be based on carrier quality of the first and/or second data carrier together with the reception quality and optionally the number of re-transmissions and/or block error data.

FIG. 7 illustrates another method of simultaneously transmitting data blocks on multiple data carriers that enables selection of data carriers based on reception quality according to the technology described herein. This FIG. 7 illustrates a first frequency carrier $f_1$ that carries a first stream 10 of multiple data blocks simultaneously as a second frequency carrier $f_2$ is used for transmitting a second stream 20 of multiple data blocks.

The first data stream 10 comprises a first set 15 of multiple data blocks and the second data stream 20 likewise comprises a second set 25 of multiple data blocks. In addition, each data block in the second set 25 is based on the same information as a data block in the first set 15. In a preferred implementation of the invention, each data block in the second set 25 comprises at least a portion of the information in a data block in the first set 15 and more preferably, each data block in the second set 25 is a re-transmission of a data block in the first set 15.

The position of the data blocks of the first set 15 within the first data stream 10 may coincide with the corresponding position of the second set 25 within the second stream 20. In such a case, the first to last data block of the first set 15 is transmitted on the first frequency $f_1$ simultaneously as the first to last data block of the second set 25 is transmitted on the second frequency $f_2$. However, in preferred implementations of the technology described herein, transmission of the data block of the second set 25 is time-delayed relative the corresponding data blocks of the first set 15 as is illustrated in FIG. 7. This means that when the first data block 12 of the first set 15 is transmitted on the first carrier $f_1$, a data block not belonging to the second set 25 is simultaneously transmitted on the second frequency $f_2$. There can be a partial overlap in the transmission of the two sets 15, 25 so that when transmitting at least one of the data blocks 14 of the first set 15 on the first frequency $f_1$, a data block 22 of the second set 15 is simultaneously transmitted on the second set 25. Another implementation could employ non-overlapping transmissions of the data block of the two sets 15, 25, so that when the first data block 22 of second set 25 is to be transmitted the last data block 14 of the first set 15 has already been sent.

The second set 25 could be a time-delayed version of the first set 15 as is illustrated in the figure. Alternatively, the second set 25 could be a re-shuffled version of the first set 15 so that the relative order of the data blocks of the second set 25 differs from the relative order of the corresponding data blocks of first set 15. Furthermore, the second set 25 could be a re-shuffled version of the first set 15 that is also delayed relative the first set (partial overlap or no overlap in transmissions).

As can be seen from the FIG. 7, a receiving unit can potentially receive up to three re-transmissions, i.e. in total four reception attempts, of a data block depending on the particular selections of frequency carriers. This should be compared to a situation with only a corresponding single frequency carrier, e.g. $f_1$, in which the receiving unit would at a maximum be able to receive one re-transmission. Bear in mind that in most real communications system, on average only one or up to a maximum of two re-transmissions on the same data carrier is possible since the throughput otherwise would be too low. The technology described herein, thus, provides more potential reception attempts that greatly decreases the residual data block error rate, but without any throughput decrease.

Assume that a given receiving unit has been listening to e.g. the first frequency carrier $f_1$ up to the time instance $t_1$. The receiving unit then at this time instance $t_1$ has a choice of continuing to listen to the first frequency $f_1$ in order to receive the last data block 14 of the first set 15 or change carrier to the second frequency $f_2$ to receive the first data block 22 of the second set 25. This frequency selection is preferably based, at least partly, on an accumulated quality representing the total quality of the reception occasions of the data block DB2 19, 12. Thus, if no further parameters are used in this selection process, the receiving unit preferably chooses the second frequency $f_2$ if the two potential reception occasions of the data block DB2 were not enough to correctly decode the information, reflected by the accumulated quality. Otherwise the receiving unit preferably continues to listen to the first frequency $f_1$.

FIG. 8 is a flow diagram illustrating additional steps of the receiving method of FIG. 2. The method starts in step S20, where the receiving unit provides scheme information associated with the first data block set and/or the second data block set. Thus, this scheme information allows the receiving unit to deduce the relative order of the data blocks in the first and/or second set. This scheme information could in addition provide information of the order of data block transmissions on all the data carriers, e.g. the relative order of the data blocks in the first and/or second data stream.

It could be possible that the transmitting units always employ a particular (standardized) transmission scheme so that the receiving unit in advance knows of the (fixed) data block order. In such a case, no provision of scheme information is of course necessary and the step S20 can be omitted. However, there might be a number of pre-defined available transmission schemes that the transmitting unit can select among. These different schemes could be adapted for different radio conditions, e.g. low respective high radio quality, different data types, available hardware in the transmitting units, etc. In such a case, the transmitting unit preferably sends a notification of the particular selected scheme to use in the current communications session to the receiving unit in step S20. This scheme notification could be a part of the session set-up procedure or be transmitted later. If there are no standardized schemes available, the transmitting unit preferably notifies the receiving unit, e.g. during the session set-up, of the subsequent data block transmissions on the different carriers in step S20. Such a notification could e.g. state that each data block is first transmitted once on a first carrier followed by a first re-retransmission on the same carrier. A second and third re-transmission follows a pre-defined period thereafter but on another data carrier.

In another implementation of step S20, the receiving unit determines a relative order of the data blocks in at least one of the sets or at least one of the data carriers based on the relative order of the data blocks in another set or on another data carrier. For example, a number of data blocks can precede the first or second set or stream on one of the carriers (data blocks DB1, DB1 and DB2 in FIG. 7). The receiving unit can then determine the subsequent order of data blocks based on the relative order of these preceding data blocks. This procedure can be extended so that the receiving unit uses the order of the hitherto received data blocks, possibly on different data carriers, to determine the expected relative order of subsequent data blocks on at least one of the data carriers in step S20.

The relative order of data blocks, i.e. the transmission scheme, could be fixed, implying that one and the same transmission scheme is used throughout the communications session. In other implementations, adaptive or changeable schemes could be used, so that the transmission scheme is changed or updated during the session. The transmitting unit then preferably notifies the receiving unit of this scheme change, unless the receiving unit can deduce it itself.

Note that a particular transmission scheme not necessarily has to imply that the relative order of data blocks on a given data carrier has to be the same as a relative order of data blocks on another data carrier.

In a next step S21, the receiving unit provides carrier information specifying at least one of the data carriers that will be used for simultaneously transmitting data blocks according to the invention. This providing step S21 could be realized by the transmitting unit sending identifiers of the used data carriers or at least of one of the data carriers, e.g. at the session set up. In the latter case, the receiving unit preferably identifies the other data carrier(s) based on the identifier of the notified carrier.

The same data carrier could be used throughout the communications session. However, the technology described herein is also applicable to communications systems employing carrier exchange. In such a case, the transmitting unit or some other network node in the system preferably notifies the receiving unit of the new data carrier(s) or the frequency hop v. In the latter case, the receiving unit can calculate the new frequency carriers according to $f_1+v$, $f_2+v$. It could also be possible to employ different frequency hops $v_1$, $v_2$ for the different frequency carriers.

Note also that the number of employed data carriers can change during the session. For example in the case with two original data carriers, a third data carrier could be added during the session so that a total of three data carriers are used for simultaneously transmitting data blocks in the session. Also the opposite is true, i.e. a data carrier can be removed and no longer be used throughout the session. This is fine as long as there are at least two remaining data carriers that can be used for simultaneously transmitting data blocks.

The method then continues to step S1 of FIG. 2.

FIG. 9 is a flow diagram illustrating an embodiment of transmitting data blocks according to the technology described herein. The method starts in step S30, where a transmitting unit, e.g. a base station, provides a first data block set comprising multiple data blocks to be transmitted to at least one receiving unit participating in a communications session with the transmitting unit. This first set of data blocks can be provided from an application in the transmitting unit or has previously been received from another transmitting unit, network node or a service provider, e.g. a MBMS server.

In a next step S31, the relative order of the multiple data blocks of the first set are re-shuffled to generate a second set of multiple data blocks. Thus, the relative order of the data blocks of the second set is different from the corresponding orders of the data blocks of the first set. The data blocks of the second set further includes the same information as the data blocks of the first block.

A first stream of multiple data blocks including the first data block set is then transmitted on a first data carrier in step S32 simultaneously as a second stream of multiple data blocks including the second data block set is transmitted on a second data carrier.

In a particular embodiment of the invention, the first and second streams consist of the first and second data block set, respectively. This basically implies that when the data blocks of the first set are transmitted on the first data carrier, the data blocks of the second set are simultaneously transmitted on the second carrier. In other embodiments, the first and second streams comprise additional data blocks besides the first and second data block set, respectively. In these cases, the transmission of the data blocks of the second set can coincide with the transmission of the first data block set, partly overlap the transmission of the first block set or be so time-separated from the transmission of the first set so there is no overlap in the transmission of data blocks for the two sets.

This procedure can of course be extended to more than two data carriers and data block sets. For example, the first data block set is first sent on a first data carrier, the second data block set is sent (simultaneously, overlapping or non-overlapping) on a second data carrier, and a third data block set, being a re-shuffled version of the first block set and the second block set, is sent (simultaneously, overlapping or non-overlapping) on a third data carrier. Alternatively, a delayed version of the first or second block set could subsequently be sent (overlapping or non-overlapping) on a third data carrier.

The method then ends.

FIG. 10 is a flow diagram illustrating additional steps of the transmitting method of FIG. 9. The method continues from step S31 in FIG. 9. In a next step S40, the transmission scheme employed for the first and/or second set and/or the first and/or second stream is communicated to the receiving unit. Thus, the relative order of the data blocks of at least one of the block sets or block streams is transmitted in this step S40. In the case of standardized or pre-defined available transmission schemes, an identifier of at least one such scheme to employ can be transmitted. Otherwise more detailed block order information is preferably transmitted.

In a next step S41, information of the employed data carriers is communicated. This information could include identifiers of all the employed data carriers or only one or portion thereof. In the latter cases, the receiving unit preferably can by itself determine the non-notified carrier(s) based on the transmitted identifier(s).

The communication of scheme information and carrier information can be sent together or separately, e.g. during session set-up or some other time during the communications session. Static scheme and/or data carriers could be employed. However, in some applications it might be preferred to be able to adapt or change the employed transmission scheme and/or data carriers. In such cases, information of the new scheme and/or data carrier(s) is preferably communicated to the relevant receiving units.

FIG. 11 is a signal diagram illustrating transmission of data blocks according to an embodiment of the technology described herein. In this figure, a first block stream 10 including the first set 15 of multiple data blocks, is transmitted on a first data carrier $f_1$ simultaneously as a second block stream 20, including the second set 25 of multiple data blocks is sent on a second carrier $f_2$. As is seen in the figure, each data block in the first set 15 has a correspondence (re-transmitted version) in the second set 25 but the relative order of blocks is different in the two sets 15, 25.

In a preferred embodiment of the invention, the first set 15 comprises a first data block 11 followed (directly) by a second data block 13 that is based on the same information as the first data block 11, e.g. being a re-transmitted version of the first block 11. This second data block 13 is in turn followed by a first block sequence 17 containing at least one data block. Correspondingly, the second set 25 preferably comprises a re-transmitted version 21 of the first data block 11 followed by a second block sequence 27 comprising at least one data block. Thereafter follows a re-transmitted version 23 of the second data block 13. In other words, in the first set 15 the relative "block distance" between a first data block 11 and its first re-transmitted version (second data block) 13 is preferably smaller than the corresponding "block distance" between the first block 21 and the second block 23 in the second set 25. A reason for this is that it may be a disadvantage with diversity after only two transmission attempts (transmission of data blocks 11, 13) for data blocks with high rate channel coding, whereas there is an advantage with diversity for the third (data block 21) and following (data block 23) transmission attempts of the same or related information. This means that the first transmission of the block and its first re-transmission preferably takes place within a relatively short period of time, whereas any following re-transmissions are preferably spread over time in order to provide diversity.

Another reason for using different block distances on different data carriers could be to increase the probability of giving the receiving unit many possibilities to receive a certain data block in a configuration with many transmitting units that transmit in an unsynchronized manner on many data carriers. If the different transmitting units would transmit data blocks in the same order and only have different time offsets, the probability of having two transmitting units transmitting the same data block simultaneously all the time would be significant. Thus, this implies that the two transmitting units would not provide more chances than a single transmitter for the receiving unit to receive any given data block. On the other hand, if the data blocks are transmitted in different orders by different transmitting units, the degrees of freedom increase dramatically and it is very unlikely that two transmitting units would be transmitting the same data blocks simultaneously more than occasionally.

A similar argument may also apply in a synchronized network if the propagation delays are substantial. Even if the transmitting units ensure not to transmit the same data block at the same time, one and the same data block may still reach the receiving unit simultaneously from different transmitters because of the different propagation delays.

The situation discussed in the foregoing with different block distances on different data carriers is in particular adapted when employing different data or code rates for the first transmission of a data block 11 compared to its re-transmissions 13, 21, 23. Thus, the first transmission 11 preferably has a high data rate and could be received on one data carrier $f_1$ in order to avoid diversity, whereas the re-transmissions 13, 21, 23 effectively give lower data rates and could be received on different carriers $f_1$, $f_2$ in order to increase the diversity. In such a case, each time a data block 11 is sent, it is transmitted with a first data rate. Any re-transmissions 13, 21, 23 of this block 11 is sent with at least a second data rate that is preferably lower than the first rate. All of these re-transmissions 13, 21, 23 could be at the second rate or decreasing rates could be employed for each re-transmission 13, 21, 23.

In a further extension, the first transmission 11 is transmitted using one frequency $f_1$ for all the radio bursts, whereas the re-transmissions could be sent on different frequencies in each burst in order to give maximum diversity.

As is illustrated in the second stream 20 in FIG. 11, a transmitting unit may temporarily interrupt sending on one data carrier $f_2$. There may be different reasons for such a sending stop. The data carrier could temporarily experience a very low radio quality or high interference levels so there is basically no point in transmitting data blocks at that point. Alternatively, the transmitting unit can temporarily be busy with performing other tasks including sending data relevant for other sessions using this carrier $f_2$.

Simulations have been performed using the scheduling scheme presented in FIG. 11. In these simulations, the data blocks were MCS-6 RLC blocks. For simplicity first only one time slot was considered and a desired bit rate of ~10 kbit/s was assumed. This number is highly relevant for MBMS services since roughly 40 kbit/s is required for video streaming over MBMS and the maximum number of time slots in MBMS is expected to be four [1], giving 10 kbit/s as a target bit rate per time slot. Furthermore, an LLC frame size of 500 bytes was used, which therefore consists of seven RLC blocks. An LLC loss rate of ~1% is regarded as acceptable in these simulations.

With a prior art solution with only a single data carrier (frequency), the nominal rate of ~30 kbit/s for MCS-6 implies that three transmissions, i.e. two re-transmissions, of each RLC block can be made $$\left(10 = \frac{30}{1+2}\right).$$

The resulting LLC loss rate for this prior art solution is illustrated in FIG. 12 with the curve "3 TX". Evidently, the service works down to 11-12 dB with <1% loss rate.

With two frequencies, i.e. according to the technology described herein, each RLC block can be transmitted six times, i.e. 3 times on each frequency, while still reaching 30 kbit/s nominal rate $$\left(10 = 2 \times \frac{30}{1+5}\right).$$

The transmission scheme illustrated in FIG. 11 was used to obtain the curve "3 TX on each of 2 freq." in FIG. 12. As can be seen in FIG. 12, 1% loss rate is obtained at approximately 4 dB lower C/I. Since EFR (Enhance Full Rate) speech requires at least somewhat below 10 dB to operate well, the communications networks are often built to be able to provide this C/I level. This means that the 4 dB gain resulting from the technology described herein may be the difference between having or not having acceptable MBMS quality at the cell border in a communications network planned for GSM speech.

For comparison reasons the prior art situation with a single frequency but with three and four re-transmissions of RLC blocks are also illustrated in the figure with the curves "4 TX" and "5 TX", respectively. As is illustrated in FIG. 12, at 1% LLC loss rate, the scheduling scheme of FIG. 11 and according to the technology described herein is even better than the prior art situation with four re-transmissions of each RLC block. In addition, the throughput is markedly higher for the scheduling scheme of FIG. 11 compared to this prior at situation with four re-transmissions.

The gain of the technology described herein can be improved further by e.g. increasing the number of employed data carriers. As the number of used data carriers grows large, the performance of the communications system approaches that of a dedicated temporary block flow (TBF) with acknowledgement/non-acknowledgement (ACK/NACK) feedback for a single receiving unit, even if the number of receiving units participating in the session is much larger than the number of carriers.

As is well known in the art, for some communications services and systems, feedback trafficking in the form of ACK/NACK can be used. In such a feedbacking, a receiving unit that did not successfully receive a data block can inform the base station thereof and request a re-transmission of the block. However, since the number of receiving units within a cell that (simultaneously) can conduct such ACK/NACK feedback is limited (typically 16), such feedback solution is of low or no use for MBMS and other broadcast and multicast services, where the average number of receiving units simultaneously participating in a broadcast/multicast session is expected to be larger (probably several tens of mobile units) than the maximum number of allowed feedbacking units. The technology described herein, thus, further enables the introduction of such multicast and broadcast by being able to provide comparatively similar performance but without any ACK/NACK feedback.

The results presented in FIG. 12 were obtained with a single time slot. With multiple time slots there is a complication. A receiving unit typically cannot switch data carrier (frequency) from one time slot to the next. This implies, for example, that with four time slots the receiving unit can select data carrier only for groups of four radio blocks instead of for every radio block. However, adjacent time slots in the same TMDA frame usually experience highly similar fading conditions and, as is shown in FIG. 13, the restriction of having to use the same data carrier for all time slots of a TDMA frame need not have a very large impact on the performance.

The transmission scheme of FIG. 11 was again used, but applied on four parallel data streams on four time slots, i.e. every RLC block had all re-transmissions on the same time slot as the original transmission. All four time slots of a TDMA frame were given the same C/I and ideal frequency hopping was used between the TMDA frames. 2 500 blocks were simulated per time slot. The receiver frequency scheme was very simple: receive on the second frequency $f_2$ if an RLC block, which so far is not correctly received, is being transmitted on at least one time slot on the second frequency $f_2$, otherwise receive on the first frequency $f_1$.

In FIG. 13, the curve "1 freq." illustrates the prior art situation with only a single frequency, the curve "2 freq., 4 TS" represents the situation described above with four time slots and the curve "2 freq., 1 TS" represents a corresponding situation but with only a single time slot (compare to the simulation of FIG. 12). As can be seen in FIG. 13, most of the gain with one time slot can be retained with four time slots. Note also that the typical point of operation for MBMS would be a residual RLC BLER in the order of $10^{-3}$.

The evaluations in FIG. 13 were made assuming frequency hopping over many frequencies. Without frequency hopping there would be additional potential advantage of being able to avoid fading dips by receiving on the frequency with better C/I.

The receiver selection scheme used in FIG. 13 is extremely simple and could easily be improved upon by e.g. employing one of the previously discussed selection schemes that uses more data than the reception quality in the selection.

Note also that by scheduling radio blocks over four consecutive time slots within one TDMA frame instead of over four consecutive TDMA frames, the problem that the data carrier (frequency) cannot be changed from one time slot to the next can completely be circumvented.

As was described in the foregoing, the selection of data carrier according to the technology described herein is preferably performed among data carriers that simultaneously transmit data blocks belonging to different LLC frames. FIG. 14 illustrates the situation where the first data stream 10 comprises the first set 15 of data blocks belonging to a first LLC frame. Simultaneously as this first set 15 is transmitted using the first carrier $f_1$, the second carrier $f_2$ is used for transmitting a third set 28 of data blocks belonging to a second LLC frame. The second block set 25 that is a re-shuffled version of the first set 15 and, thus, includes data blocks belonging to the first LLC frame then follows on the second carrier $f_2$. Simultaneously as the second set 25 is transmitted on the second carrier $f_2$, the first carrier $f_1$ is used for sending a fourth set 18 of data blocks that belongs to the second LLC frame or a third LLC frame. Thus, in this transmission scheme according to the technology described herein, the relevant data carriers $f_1$, $f_2$ simultaneously carry data blocks belonging to different LLC frames, thereby allowing receiving units to refrain from listening to a particular carrier which currently transmits a data block belonging to a LLC frame that is regarded as already failed for a receiving unit.

As was discussed above in connection with FIG. 1, the data blocks on the different data carriers do not necessarily have to be transmitted by one and the same transmitting unit. As is illustrated in FIG. 1, a first data carrier 310 can be used by a first base station 200-1, whereas the other data carrier 320 is used by a second base station 200-2. If a receiving unit 100-3 is able to listen to the transmission in the two cells 205-1, 205-1 of these base stations 200-1, 200-2, the results will be the same as when having a single transmitting unit. The advantage with this variant is that no extra bandwidth is need for the extra data carrier. The technology described herein is particularly advantageous for receiving units having low C/I and since these units 100-3 typically are likely to be close to the cell border, it is not unlikely that the relevant unit 100-3 may be able to listen to another base station 200-2. In the most general case, each base station 200-1, 200-2 can use one of more data carriers so that the receiving unit 100-3 potential can select among more than two data carriers, which may originate from a same cell or different cells 205-1, 205-2.

In another embodiment of the technology described herein, a transmitting unit 200-1, e.g. base station, employs at least one relaying capable unit 100-5 for performing the transmission on at least one of the data carriers 320. In such a case, the base station 200-1 sends 325 the data blocks of the first or second stream to the relaying capable unit 100-5 and commands it to forward the stream to one or more receiving units 100-4 on a given data carrier 320. Simultaneously as this relaying unit 100-5 forwards one of the streams, the base stations 200-1 transmits the other stream(s) on other data carrier(s) 310.

In a further alternative embodiment, the base station 200-1 sends 325 data blocks of the first stream to both the relaying capable mobile unit 100-5 and the receiving unit 100-4. The relaying capable unit 100-5 re-shuffles the order of the data blocks of this first stream, preferably based on a re-shuffling command from the base station or provides elsewhere, and transmits 320 the data blocks as the second stream to the receiving unit 100-4.

The relaying capable unit 100-5 could be a fixed or mobile node constituting a part of the network architecture, e.g. in the form of a repeater. In an alternative implementation, a mobile terminal 100-5 or some other non-network communicating unit could be employed for this task. Also an implementation with more than one relaying capable unit is possible e.g. the case of at least three employed data carriers.

FIG. 15 is a flow diagram illustrating additional steps of the transmitting method of FIG. 9 for the case with employment of a relaying capable unit. The method continues from step S31 in FIG. 9. In a next step S50, the base station transmits the second (or first) stream of data blocks to the relaying capable unit. Together with this data block transmission, or separately, the base station commands the relaying capable unit to forward the sent data blocks to one or more receiving units. The data carrier to use for this data block forwarding could be specified by the base station and included in the command or could possibly be selected by the relaying unit itself. The method then continues to step S32 of FIG. 9, where the base station transmits the first (or second) data stream on the first data carrier simultaneously as the relaying capable unit forwards the second (or first) data stream on the second data carrier.

Alternatively, the base station transmits the first stream to the relaying capable unit and commands it to re-shuffle the order of the data blocks to generate the second stream. Furthermore, the relaying unit is also commanded to send this re-shuffled data stream on a different data carrier than what was used to receive the first stream.

FIG. 16 is a schematic block diagram of a receiving unit 100 according to the technology described herein exemplified as a mobile terminal or unit. However, the technology described herein is not limited to receiving units 100 in the form of mobile terminals but can be applied to any receiving unit participating in a communications session, e.g. MBMS session, with a transmitting node and is adapted for receiving data blocks throughout the session.

The receiving unit 100 includes a general input and output (I/O) unit 110 for receiving data blocks and possibly for receiving scheme and carrier identifiers. The unit 100 further comprises a demodulator/decoder 120 used for demodulating and decoding data blocks received by the I/O unit 110. This demodulator/decoder 120 or some other unit in the receiving unit 100 also determines a reception quality for a received data block. As was mentioned above, this reception quality could be obtained from a CRC check, be a simple decoded/non-decoded notification or some more elaborated quality parameter, such as SNR, BLEP, BLER, BEP, BER, C/I, etc.

A carrier selector 130 is implemented in the receiving unit 120 for selecting a data carrier among multiple available carriers to listen to at a particular time instance based on the receptions quality estimated by the demodulator/decoder 120. This selector 130 can be configured for selecting one data carrier out of at least two possible carriers or, in the case of multi-carrier capable unit 100, at least two carriers out of at least three possible carriers. These possible data carriers further simultaneously carry data blocks, of which one is based on the same information as the data block previously received by the I/O unit 110 and based on which the demodulator/decoder 120 estimated the reception quality.

The carrier selector 130 can also employ reception quality associated with multiple previously received data blocks, an accumulated reception quality and/or employ other data than the reception quality/qualities in the selection process. Information of the number of remaining re-transmissions data blocks, carrier quality data and/or information of previously failed LLC frames can also be used together with the reception quality.

A scheme identifier 140 is preferably implemented in the receiving unit 100 for notifying the carrier selector 130 of the relative expected order of the data blocks on the different carriers and/or the number of remaining re-transmissions of a particular data block. This scheme identifier 140 basically determines a relative expected order of the data blocks on the different data carriers. This determination could be based on a scheme identifier received by the I/O unit 110 from the transmitting unit, or the scheme identifier 140 determines it itself based on the order which the data blocks hitherto have been received by the I/O unit 110.

A corresponding optional carrier identifier 150 is preferably provided in the receiving unit 100 for notifying the selector 130 of the possible data carriers to select among. This identifier 150 could provide this information from notifications originating from the transmitting unit or some other external unit. Alternatively, the identifier 150 identifies at least one of the data carriers itself, e.g. based on information of at least one of the other carriers.

The units 110 to 150 of the receiving unit 100 may be provided as software, hardware or a combination thereof.

FIG. 17 is a schematic block diagram of an embodiment of a transmitting system 400 according to the technology described herein. The transmitting system 400 includes an I/O unit 410 for communicating with external units, including receiving units participating in a communications session with transmitting system 400. This I/O unit 410 is in particular adapted for simultaneously transmitting data blocks on multiple data carriers 310, 320. The I/O unit 410 can include or be connected to an antenna or transmitter arrangement that is employed for this simultaneous block transmission. The antenna arrangement may in turn include multiple separate antennas, where e.g. each such antenna is adapted for transmitting data blocks at a particular frequency carrier.

The system 400 also includes a data block buffer 440 that, at least temporarily, stores the data blocks to be transmitted in a (unicast, broadcast or multicast) session. The data blocks themselves may have been generated by a particular application in the transmitting system 400. Alternatively, they are received from an external source, such as a service provider, e.g. a MBMS server, or some other communicating network node.

A block set provider 420 is arranged in the transmitting system 400 for providing a first set of multiple data blocks, preferably from the associated data buffer 440. This first block set is to be transmitted by the I/O unit 410 and antenna arrangement using one of the data carriers 310, 320. The data blocks of the first set, or at least an identifier thereof, is brought by the set provider 420 to a block set shuffler 430. This set shuffler 430 re-shuffles the relative order of the data blocks of the first set to generate at least a second data block set. This second block set is then to be transmitted by the I/O unit 410 on another of the data carriers 310, 320. The shuffler 430 typically does not re-shuffle the data blocks themselves in the buffer 440 but rather re-shuffles identifiers of the data blocks of the first set. The data blocks are then fetched from the buffer 440 in the order provided by the identifiers.

In a preferred embodiment, the set shuffler 430 generates a second set, in which the relative position of two data blocks that are based on common information are different compared to the relative position of these data blocks in the first set. Furthermore, the distance between these data blocks in terms of the number of intermediate data blocks is preferably larger in the second set compared to the first set in order to increase the diversity when transmitting the data blocks.

The particular re-shuffling scheme to employ by the set shuffler 420 and possibly the order of the data block in the first set can be stipulated by a transmission scheme provided by an optional scheme selector 450. This scheme selector 450 preferably selects the used scheme from an associated database 460, arranged in the transmitting system 400 or provided externally, with multiple different pre-defined available schemes. The particular scheme to select could, at least partly, be based on input information in the form of e.g. current radio quality conditions, the number of participating receiving units, what kind of data that is to be transmitted, available hardware in the transmitting system 400, etc.

In an alternative implementation, there are no pre-defined (standardized) schemes in the database 460 and the scheme selector 450 generates a suitable scheme itself, e.g. based on the above-identified input information.

The database 460 can also include carrier data, or this form of data could be provided in a dedicated database. When the I/O unit 410 is to transmit the data blocks of the first set as defined by the set provider 420 and the blocks of the second set as defined by the set shuffler 430, notification of the data carrier to employ can be fetched from the database 460. It could also be possible that the transmitting system 400 only has access to a fixed limited number of data carriers and these are always employed by the I/O unit 410 when transmitting the data blocks so that no selection of suitable data carriers has to be performed. Alternatively, an external unit can inform the transmitting system 400 and I/O unit 410 of the data carriers to employ.

The I/O unit 410 is preferably also configured for forwarding information of the particular used transmission scheme as selected by the scheme selector 450 and/or identifiers of the data carriers to the receiving unit(s) participating in the communications session.

The I/O unit 410 then transmits the data blocks of the first and second set in the form of a first data stream on a first data carrier 310, where the first stream comprises the first set, and a second stream, including the second set, on a second data carrier 320. This principle is simply extended to the case with more than two available data carriers. Note that although, the first and second stream are transmitted simultaneously by the I/O unit 410 on the different data carriers 310, 320, the data blocks of the first and second set do not necessarily have to be transmitted simultaneously as their relative position within the first and second stream, respectively, may differ.

The I/O unit 410 can use different data rates for the different data blocks. In a preferred implementation, a higher data rate is used for a particular data block the first time it is transmitted. Correspondingly, a re-transmission of this data block, whether occurring in the first set or the second set, is preferably performed at a comparatively lower data rate.

The units 410, 420, 430 and 450 of the transmitting system 400 may be provided as software, hardware or a combination thereof. The units 410 to 460 may be implemented together in the transmitting system 400 in a single network node, e.g. a base station node. Alternatively, a distributed implementation is also possible with some of the units provided in different network nodes in the communications system.

FIG. 18 is a schematic block diagram of a distributed transmitting system 400 having dedicated communicating network nodes 200-1, 200-2 and a data block management node 500. In this implementation, a base station controller 500 or some other network node, e.g. a base station, comprises the block set provider 520, block set shuffler 530, data buffer 540, scheme selector 550 and scheme and carrier database 560. The operation of these units is similar to what is described above in connection with FIG. 17 and is not discussed further herein. Once the block set provider 520 and set shuffler 530 has defined the first and second data block set, e.g. based on a transmission scheme selected by the selector 550, the relevant data blocks are forwarded from the data buffer 540 to the relevant transmitting unit, represented by base stations 200-1, 200-2 in the figure. Each such base station 200-1, 200-2 will then manage the transmission of one of the data block streams and sets and has a corresponding data buffer or cache 240-1, 240-2, in which the data blocks are temporarily buffered before transmission using I/O units 210-1, 210-2 of the base stations 200-1, 200-2. For example, the base station controller 500 forwards the data blocks of the first stream to the first base station 200-1, preferably together with a notification of the order, in which the data blocks should be transmitted, unless this is evident from the order, in which the data blocks are forwarded. In addition, information of the data carrier to use for the first base station 200-1 and possibly information of the time instance at which the transmission should be started can be sent to the base station 200-1. The second base station 200-2, correspondingly, receives the data blocks of the second stream, preferably together with the order information, carrier information and time information.

The first base station 200-1 then sends the data blocks of the first stream on its assigned data carrier 310 simultaneously as the second base station transmits the second data block stream on its associated data carrier 320.

The transmitting system 400 disclosed in FIG. 18 can be extended to include more than two dedicated transmitting units 200-1, 200-2 that use different data carriers 310, 320.

The units 210-1, 210-2, 510, 520, 530 and 550 of the transmitting system 400 may be provided as software, hardware or a combination thereof. The data block management functionality can be performed with other network nodes than base station controllers 500, for example by a third base station.

FIG. 19 is a schematic block diagram of another distributed implementation of the transmitting system 400. In this implementation, a first network node, represented by a first base station 200-1, includes the block set provider 220, block set shuffler 230, data buffer 240, scheme selector 250 and scheme and carrier database 260. The operation of these units is similar to the corresponding units of FIG. 17 and is not discussed further. In addition, the first base station 200-1 is also adapted for sending at least one of the simultaneously transmitted data block streams on at least one data carrier 310.

The other data block stream(s) are forwarded by the I/O unit 210-1 of this first base station 200-1 to at least one relaying capable unit, represented by a second base station 200-2 in the figure. This second base station 200-2 is then instructed to transmit the forwarded data blocks on a different data carrier 320 than used by the first base station 200-1. In another implementation, the relaying capable unit 200-2 could be a repeater node, a mobile repeater or actually a mobile unit.

The units 210-1, 210-2, 220, 230 and 250 of the transmitting system 400 may be provided as software, hardware or a combination thereof.

It will be understood by a person skilled in the art that various modifications and changes may be made to the technology described herein without departure from the scope thereof, which is defined by the appended claims.

REFERENCES

[1] 3GPP TS 43.246, version 6.1.0: $3^{rd}$ Generation Partnership Project; Technical Specification Group GSM/EDGE Radio Access Network; Multimedia Broadcast Multicast Service (MBMS) in the GERAN; stage 2 (Release 6), November 2004.

The invention claimed is:

1. A method of receiving data blocks comprising:
  receiving a first data block from a first data carrier, at a machine-implemented receiving unit; and
  using the machine-implemented receiving unit to select, based on a reception quality of said first data block, between listening to the first data carrier carrying a second data block and a fourth data block following said second data block on the first carrier or changing to listen to a second data carrier simultaneously carrying a third data block, wherein the third data block and the fourth data block comprise same payload information as the first data block.

2. The method according to claim 1, further comprising said receiving unit receiving a data block being said second data block or said third data block on said selected data carrier.

3. The method according to claim 1, further comprising the receiving unit selecting between said first data carrier and said second data carrier based on said reception quality and based on information of a number of potential subsequent data blocks comprising at least a portion of the information of said first data block or said second data block.

4. The method according to claim 1, wherein data blocks are grouped into block frames, each block frame comprises multiple data blocks, and wherein the method further comprises said receiving unit selecting between said first data carrier and said second data carrier based on said reception quality and based on information of block detection error for a data block belonging to a same block frame as said first data block or said second data block.

5. The method according to claim 1, further comprising said receiving unit selecting between said first data carrier and said second data carrier based on said reception quality and based on carrier quality associated with at least one of said first data carrier and said second data carrier.

6. The method according to claim 1, wherein said first data carrier carries a first stream of data blocks and said second data carrier simultaneously carries a second different stream of data blocks, each data block in a second set of multiple data blocks of said second stream comprises at least a portion of the information in a data block in a first set of multiple data blocks of said first stream, said first set comprises said second data block and said second set comprises said third data block.

7. The method according to claim 6, further comprising said receiving unit receiving information of a relative order of said data blocks of at least one of said first data set and said second data set.

8. The method according to claim 1, wherein said third data block is a retransmitted version of said first data block.

9. The method of claim 1, further comprising said receiving unit listening either to the first data carrier or the second data carrier but not both.

10. The method according to claim 1, wherein the machine-implemented receiving unit changes to the second data carrier prior to receiving the second data block or the third data block.

11. A method of transmitting data blocks comprising:
providing a first set of multiple data blocks;
providing a second set of multiple data blocks that is a re-shuffled version of said first set;
using a machine-implemented transmitter arrangement to transmit, on a first data carrier, a first stream of data blocks, which comprises said first set, and to simultaneously transmit, on a second data carrier, a second stream of data blocks, which comprises said second set;
using a machine-implemented selector to select, from a set of predefined scheduling schemes, a scheduling scheme that specifies a relative order of said data blocks of at least one of said first data set and said second data set; and
using the machine-implemented transmitter arrangement to communicate a scheme identifier of said selected scheduling scheme.

12. The method according to claim 11, wherein said first set comprises a first data block followed by a second data block followed by a block sequence comprising at least a third data block, said first data block and said second data block are based on common information, and said second set comprises said first data block followed by a block sequence comprising at least a fourth data block followed by said second data block.

13. The method according to claim 11, wherein said first data stream is transmitted by a base station and said second data stream is simultaneously transmitted by a relaying capable unit.

14. The method according to claim 13, further comprising:
transmitting said second data stream to said relaying capable unit; and
commanding said relaying capable unit to forward said second data stream.

15. The method according to claim 11, wherein the providing the second set of multiple data blocks comprises re-shuffling a relative order of the multiple data blocks of the first set to provide the second set.

16. A receiving unit comprising:
a receiver for receiving a first data block from a first data carrier; and
a machine-implemented selector configured to select, based on a reception quality of said first data block, between listening to the first data carrier carrying a second data block and a fourth data block following said second data block on the first carrier or changing to listen to a second data carrier simultaneously carrying a third data block, where the third data block and the fourth data block comprise same payload information as the first data block.

17. The receiving unit according to claim 16, wherein said receiver is configured for receiving a data block being said second data block or said third data block on the data carrier selected by said selector.

18. The receiving unit according to claim 16, wherein said selector is configured for selecting between said first data carrier and said second data carrier based on said reception quality and based on information of a number of potential subsequent data blocks comprising at least a portion of the information of said first data block or said second data block.

19. The receiving unit according to claim 16, wherein data blocks are grouped into block frames, each block frame comprises multiple data blocks, said selector is configured for selecting between said first data carrier and said second data carrier based on said reception quality and based on information of block detection error for a data block belonging to a same block frame as said first data block or said second data block.

20. The receiving unit according to claim 16, wherein said selector is configured for selecting between said first data carrier and said second data carrier based on said reception quality and based on carrier quality associated with at least one of said first data carrier and said second data carrier.

21. The receiving unit according to claim 16, wherein said first data carrier carries a first stream of data blocks and said second data carrier simultaneously carries a second different stream of data blocks, each data block in a second set of multiple data blocks of said second stream comprises at least a portion of the information in a data block in a first set of multiple data blocks of said first stream, said first set comprises said second data block and said second set comprises said third data block.

22. The receiving unit according to claim 21, wherein said receiver is configured for receiving information of a relative order of said data blocks of at least one of said first data set and said second data set.

23. The receiving unit according to claim 16, wherein said receiving unit is a mobile terminal.

24. The method of claim 16, wherein said receiving unit is configured to listen either to the first data carrier or the second data carrier but not both.

25. The receiving unit according to claim 1, wherein the machine-implemented selector changes to the second data carrier prior to receiving the second data block or the third data block.

26. A system for transmitting data blocks comprising:
means for providing a first set of multiple data blocks;
means for providing a second set of multiple data blocks that is a reshuffled version of said first set; and
a machine-implemented transmitter arrangement configured to transmit, on a first data carrier, a first stream of data blocks, which comprises said first set, and to simultaneously transmit, on a second data carrier, a second stream of data blocks, which comprises said second set;
a selector configured to select, from a set of predefined scheduling schemes, a scheduling scheme that specifies a relative order of said data blocks of at least one of said first data set and said second data set, said transmitter arrangement is configured for transmitting an identifier of said selected scheduling scheme.

27. The system according to claim 26, wherein said transmitter arrangement comprises a first transmitter and a second transmitter, said first transmitter is configured for transmitting said first data stream and said second transmitter is configured for transmitting said second data stream.

28. The system according to claim 27, wherein said first transmitter is arranged on a base station and said second transmitter is arranged on a relaying capable unit.

29. A base station comprising system for transmitting data blocks, said system comprising:
means for providing a first set of multiple data blocks;
means for providing a second set of multiple data blocks that is a reshuffled version of said first set; and
a machine-implemented transmitter arrangement configured to transmit, on a first data carrier, a first stream of data blocks, which comprises said first set, and to simultaneously transmit, on a second data carrier, a second stream of data blocks, which comprises said second set;
a machine-implemented selector configured to select, from a set of predefined scheduling schemes, a scheduling scheme that specifies a relative order of said data blocks of at least one of said first data set and said second data set; and
wherein the machine-implemented transmitter arrangement is configured to communicate a scheme identifier of said selected scheduling scheme.

* * * * *

UNITED STATES PATENT AND TRADEMARK OFFICE
CERTIFICATE OF CORRECTION

| | |
|---|---|
| PATENT NO. | : 8,737,402 B2 |
| APPLICATION NO. | : 11/913446 |
| DATED | : May 27, 2014 |
| INVENTOR(S) | : Axnäs et al. |

It is certified that error appears in the above-identified patent and that said Letters Patent is hereby corrected as shown below:

IN THE SPECIFICATION:

In Column 7, Line 61, delete "their" and insert -- there --, therefor.

IN THE CLAIMS:

In Column 26, Line 65, in Claim 24, delete "method of" and insert -- receiving unit according to --, therefor.

In Column 27, Line 1, in Claim 25, delete "claim 1," and insert -- claim 16, --, therefor.

Signed and Sealed this
Eighteenth Day of November, 2014

Michelle K. Lee
*Deputy Director of the United States Patent and Trademark Office*